(12) United States Patent  Kurtz et al.

(10) Patent No.: US 6,665,119 B1
(45) Date of Patent: Dec. 16, 2003

(54) WIRE GRID POLARIZER

(75) Inventors: Andrew F. Kurtz, Rochester, NY (US); Sujatha Ramanujan, Pittsford, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/271,197

(22) Filed: Oct. 15, 2002

(51) Int. Cl.$^7$ .............................................. G02B 27/28
(52) U.S. Cl. ...................... 359/486; 359/485; 359/484; 353/20
(58) Field of Search ................................ 359/484–489, 359/495, 558, 566; 353/20, 31, 34

(56) References Cited

U.S. PATENT DOCUMENTS

| | | | |
|---|---|---|---|
| 2,224,214 A | 12/1940 | Brown | 359/486 |
| 2,287,598 A | 6/1942 | Brown | 65/59.1 |
| 3,046,839 A | 7/1962 | Bird et al. | 427/163.1 |
| 3,235,630 A | 2/1966 | Doherty et al. | 359/352 |
| 3,291,550 A | 12/1966 | Bird et al. | 359/352 |
| 3,479,168 A | 11/1969 | Bird et al. | 65/439 |
| 3,536,373 A | 10/1970 | Bird et al. | 359/486 |
| 3,969,545 A | 7/1976 | Slocum | 427/163.1 |
| 4,049,944 A | 9/1977 | Garvin et al. | 219/121.2 |
| 4,221,464 A | 9/1980 | Pedinoff et al. | 359/352 |
| 4,289,381 A | 9/1981 | Garvin et al. | 427/163.1 |
| 4,456,515 A | 6/1984 | Krueger et al. | 204/192.27 |
| 4,512,638 A | 4/1985 | Sriram et al. | 359/352 |
| 4,514,479 A | 4/1985 | Ferrante | 430/2 |
| 4,743,092 A | 5/1988 | Pistor | 359/486 |
| 4,946,231 A | 8/1990 | Pistor | 359/350 |
| 5,122,907 A | 6/1992 | Slocum | 359/797 |
| 5,177,635 A | 1/1993 | Keilmann | 359/352 |
| 5,383,053 A | 1/1995 | Hegg et al. | 359/486 |
| 5,748,368 A | * 5/1998 | Tamada et al. | 359/486 |
| 5,748,369 A | * 5/1998 | Yokota | 359/485 |
| 5,751,466 A | 5/1998 | Dowling et al. | 359/248 |
| 5,907,427 A | 5/1999 | Scalora et al. | 359/248 |
| 5,991,075 A | * 11/1999 | Katsuragawa et al. | 359/486 |
| 6,081,376 A | 6/2000 | Hansen et al. | 359/485 |
| 6,108,131 A | 8/2000 | Hansen et al. | 359/486 |
| 6,122,103 A | 9/2000 | Perkins et al. | 359/486 |
| 6,208,463 B1 | 3/2001 | Hansen et al. | 359/486 |
| 6,234,634 B1 | * 5/2001 | Hansen et al. | 353/20 |
| 6,243,199 B1 | 6/2001 | Hansen et al. | 359/486 |
| 6,288,840 B1 | 9/2001 | Perkins et al. | 359/486 |
| 2002/0167727 A1 | * 11/2002 | Hansen et al. | 359/486 |

OTHER PUBLICATIONS

S. Bains; Photonic Band Gap Structure Makes Metals Transparent; OE Reports, Dec. 1999, p. 3.

M. Scalora, M. J. Bloemer, A. S. Pethel, J. P. Dowling, C. M. Bowden, and A. S. Manka; Transparent, Metall–Dielectric, One–Dimensional, Photonic Band–Gap Structures; J. App. Phys. 83 (5), Mar. 1, 1998, pp. 2377–2383.

* cited by examiner

Primary Examiner—Scott J. Sugarman
Assistant Examiner—M. Hasan
(74) Attorney, Agent, or Firm—Nelson Adrian Blish

(57) ABSTRACT

A wire grid polarizer (300) for polarizing an incident light beam (130) comprises a substrate having a first surface. A grid or array of parallel, elongated, composite wires (310) is disposed on the first surface (307), and each of the adjacent wires are spaced apart on a grid period less than a wavelength of incident light. Each of the wires comprises an intra-wire substructure (315) of alternating elongated metal (330$a$–$i$) wires and elongated dielectric layers (350$a$–$i$).

47 Claims, 15 Drawing Sheets

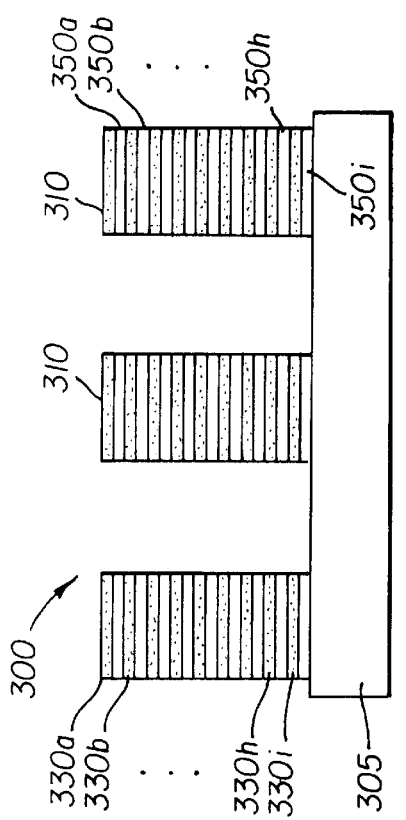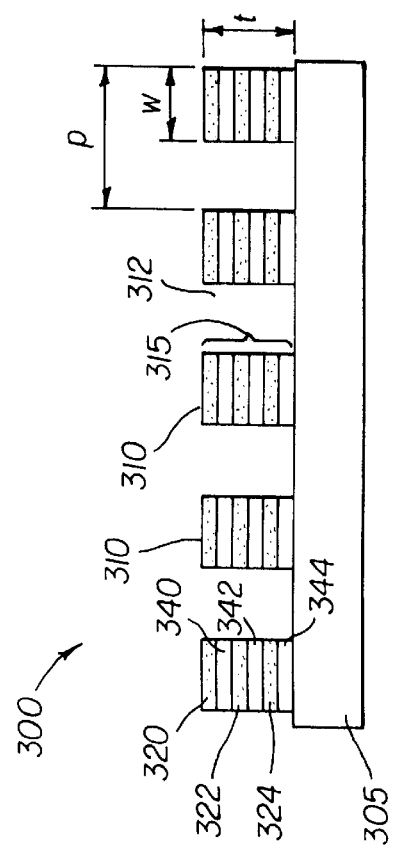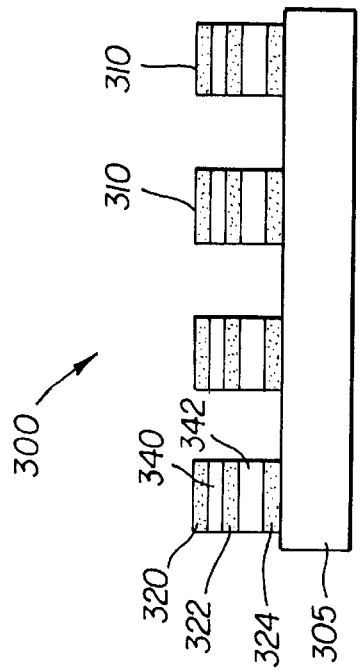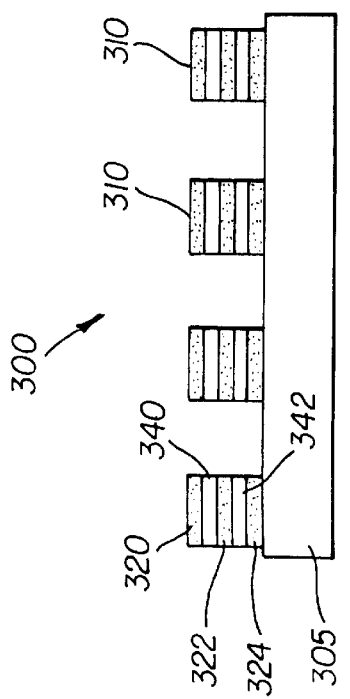

WIRE GRID POLARIZER

CROSS REFERENCE TO RELATED APPLICATIONS

Reference is made to commonly-assigned U.S. patent application Ser. No. 09/799,281, now U.S. Pat. No. 6,532,111 B2 filed Mar. 5, 2001, entitled WIRE GRID POLARIZER, by Kurtz et al. and U.S. patent application Ser. No. 09/977,544, filed Oct. 15, 2001, entitled DOUBLE SIDED WIRE GRID POLARIZER, by Silverstein et al., the disclosures of which are incorporated herein.

FIELD OF THE INVENTION

The present invention relates to wire grid polarizers in general and in particular to multilayer wire grid polarizers and beamsplitters for the visible spectrum.

BACKGROUND OF THE INVENTION

The use of an array of parallel conducting wires to polarize radio waves dates back more than 110 years. Wire grids, generally in the form of an array of thin parallel conductors supported by a transparent substrate, have also been used as polarizers for the infrared portion of the electromagnetic spectrum.

The key factor that determines the performance of a wire grid polarizer is the relationship between the center-to-center spacing, sometimes referred to as period or pitch, of the parallel grid elements and the wavelength of the incident light. If the grid spacing or period is long compared to the wavelength, the grid functions as a diffraction grating, rather than as a polarizer, and diffracts both polarizations, not necessarily with equal efficiency, according to well-known principles. However, when the grid spacing (p) is much shorter than the wavelength, the grid functions as a polarizer that reflects electromagnetic radiation polarized parallel ("s" polarization) to the grid, and. transmits radiation of the orthogonal polarization ("p" polarization).

The transition region, where the grid period is in the range of roughly one-half of the wavelength to twice the wavelength, is characterized by abrupt changes in the transmission and reflection characteristics of the grid. In particular, an abrupt increase in reflectivity, and corresponding decrease in transmission, for light polarized orthogonal to the grid elements will occur at one or more specific wavelengths at any given angle of incidence. These effects were first reported by Wood in 1902, and are often referred to as "Wood's Anomalies." Subsequently, in 1907, Rayleigh analyzed Wood's data and had the insight that the anomalies occur at combinations of wavelength and angle where a higher diffraction order emerges. Raleigh developed the following equation to predict the location of the anomalies, which are also commonly referred to in the literature as "Rayleigh Resonances."

$$\lambda = \epsilon(n +- \sin \theta)/k \tag{1}$$

where epsilon ($\epsilon$) is the grating period; n is the refractive index of the medium surrounding the grating; k is an integer corresponding to the order of the diffracted term that is emerging; and lambda and theta are the wavelength and incidence angle (both measured in air) where the resonance occurs.

For gratings formed on one side of a dielectric substrate, n in the above equation may be equal to either 1, or to the refractive index of the substrate material. Note that the longest wavelength at which a resonance occurs is given by the following formula:

$$\lambda = \epsilon(n + \sin \theta) \tag{2}$$

where n is set to be the refractive index of the substrate.

The effect of the angular dependence is to shift the transmission region to larger wavelengths as the angle increases. This is important when the polarizer is intended for use as a polarizing beamsplitter or polarizing turning mirror.

In general, a wire grid polarizer will reflect light with its electric field vector parallel ("s" polarization) to the wires of the grid, and transmit light with its electric field vector perpendicular ("p" polarization) to the wires of the grid, but the plane of incidence may or may not be perpendicular to the wires of the grid as discussed here. Ideally, the wire grid polarizer will function as a perfect mirror for one polarization of light, such as the S polarized light, and will be perfectly transparent for the other polarization, such as the P polarized light. In practice, however, even the most reflective metals used as mirrors absorb some fraction of the incident light and reflect only 90% to 95%, and plain glass does not transmit 100% of the incident light due to surface reflections. The performance of ire grid polarizers, and indeed other polarization devices, is mostly characterized by the contrast ratio, or extinction ratio, as measured over the range of wavelengths and incidence angles of interest. For a wire grid polarizer or polarization beamsplitter, the contrast ratios for the transmitted beam (Tp/Ts) and the reflected beam (Rs/Rp) may both be of interest.

Historically, wire grid polarizers were developed for use in the infrared, but were unavailable for visible wavelengths. Primarily, this is because processing technologies were incapable of producing small enough sub-wavelength structures for effective operation in the visible spectrum. Nominally, the grid spacing or pitch (p) should be less than $\sim\lambda/5$ for effective operation (for p $\sim$0.10–0.13 $\mu$m for visible wavelengths), while even finer pitch structures (p$\sim\lambda/10$ for example) can provide further improvements to device contrast. However, with recent advances in processing technologies, including 0.13 $\mu$m extreme UV photolithography and interference lithography, visible wavelength wire grid structures have become feasible. Although there are several examples of visible wavelength wire grid polarizers devices known in the art, these devices do not provide the very high extinction ratios (>1,000:1) across broadband visible spectra needed for demanding applications, such as for digital cinema projection.

An interesting wire grid polarizer is described by Garvin et al. in U.S. Pat. No. 4,289,381, in which two or more wire grids residing on a single substrate are separated by a dielectric interlayer. Each of the wire grids are deposited separately, and the wires are thick enough (100–1000 nm) to be opaque to incident light. The wire grids effectively multiply, such that while any single wire grid may only provide 500:1 polarization contrast, in combination a pair of grids may provide 250,000:1. This device is described relative to usage in the infrared spectrum (2–100 $\mu$m), although presumably the concepts are extendable to visible wavelengths. However, as this device employs two or more wire grids in series, the additional contrast ratio is exchanged for reduced transmission efficiency and angular acceptance. Furthermore, the device is not designed for high quality extinction for the reflected beam, which places some limits on its value as a polarization beamsplitter.

A wire grid polarization beamsplitter for the visible wavelength range is described by Hegg et al. in U.S. Pat. No. 5,383,053, in which the metal wires (with pitch p<<$\lambda$ and $\sim$150 nm features) are deposited on top of metal grid lines, each of which are deposited onto a glass or plastic substrate.

While this device is designed to cover much of the visible spectrum (0.45–0.65 μm), the anticipated polarization performance is rather modest, delivering an overall contrast ratio of only 6.3:1.

Tamada et al, in U.S. Pat. No. 5,748,368, describes a wire grid polarizer for the near infrared spectrum (0.8–0.95 μm) in which the structure of the wires is shaped in order to enhance performance. In this case, operation in near infrared spectrum is achieved with a wire structure with a long grid spacing ($\lambda/2<p<\lambda$) rather than the nominal small grid spacing ($p\sim\lambda/5$) by exploiting one of the resonances in the transition region between the wire grid polarizer and the diffraction grating. The wires, each ~140 nm thick, are deposited on a glass substrate in an assembly with wedge plates. In particular, the device uses a combination of trapezoidal wire shaping, index matching between the substrate and a wedge plate, and incidence angle adjustment to tune the device operation to hit a resonance band. While this device provides reasonable extinction of ~35:1, which would be useful for many applications, this contrast is inadequate for applications, such as digital cinema, which require higher performance. Furthermore, this device only operates properly within narrow wavelength bands (~25 nm) and the device is rather angularly sensitive (a 2° shift in incidence angle shifts the resonance band by ~30 nm). These considerations also make the device unsuitable for broadband wavelength applications in which the wire grid device must operate in "fast" optical system (such as F/2).

Most recently, U.S. Pat. Nos. 6,108,131 (Hansen et al.) and 6,122,103 (Perkins et al.), both assigned to Moxtek Inc. of Orem, Utah, describe wire grid polarizer devices designed for the visible spectrum. Accordingly, U.S. Pat. No. 6,108,131 describes a straightforward wire grid polarizer designed to operate in the visible region of the spectrum. The wire grid nominally consists of a series of individual wires fabricated directly on a substrate with a ~0.13 μm gridline spacing ($p\sim\lambda/5$), wire nominal width of 0.052–0.078 μm wide (w), and wire thickness (t) greater than 0.02 μm. By using wires of ~0.13 μm grid spacing or pitch, this device has the required sub-visible wavelength structure to allow it to generally operate above the long wavelength resonance band and in the wire grid region. U.S. Pat. No. 6,122,103 proposes a variety of improvements to the basic wire grid structure directed to broadening the wavelength spectrum and improving the efficiency and contrast across the wavelength spectrum of use without requiring finer pitch structures (such as ~$\lambda/10$). Basically, a variety of techniques are employed to reduce the effective refractive index (n) in the medium surrounding the wire grid, in order to shift the longest wavelength resonance band to shorter wavelengths (see equations (1) and (2)). This is accomplished most simply by coating the glass substrate with a dielectric layer which functions as an anti-reflectional (AR) coating, and then fabricating the wire grid onto this intermediate dielectric layer. The intermediate dielectric layer effectively reduces the refractive index experienced by the light at the wire grid, thereby shifting the longest wavelength resonance shorter. U.S. Pat. No. 6,122,103 also describes alternate designs where the effective index is reduced by forming grooves in the spaces between the wires, such that the grooves extend into the substrate itself, and/or into the intermediate dielectric layer which is deposited on the substrate. As a result of these design improvements, the low wavelength band edge shifts ~50–75 nm lower, allowing coverage of the entire visible spectrum. Furthermore, the average efficiency is improved by ~5% across the visible spectrum over the basic prior art wire grid polarizer.

While the devices described in U.S. Pat. Nos. 6,108,131 and 6,122,103 are definite improvements over the prior art, there are yet further opportunities for performance improvements for both wire grid polarizers and polarization beamsplitter. In particular, for optical systems with unpolarized light sources, where system light efficiency must be maximized, polarization beamsplitters which provide high extinction of both the reflected and transmitted beams are valuable. As the commercially available wire grid polarizers from Moxtek provide only ~20:1 contrast for the reflected channel, rather than 100:1, or more desirable 2,000:1, its utility is limited. Additionally, the performance of these devices varies considerably across the visible spectrum, with the polarization beamsplitter providing contrast ratios for the transmitted beam varying from ~300:1 to ~1200:1 from blue to red, while the reflected beam contrast ratios vary from 10:1 to 30:1. Thus there are opportunities to provide polarization contrast performance in the blue portion of the visible spectrum in particular, as well as more uniform extinction across the visible. Finally, there are also opportunities to improve the polarization contrast for the transmitted polarization light beyond the levels provided by prior art wire grid devices. Such improvements would be of particular benefit for the design of electronic imaging systems, such as electronic projection systems, including those for digital cinema.

Thus, there exists a need for an improved wire grid polarizer, particularly for use in visible light systems requiring broad wavelength bandwidth and high contrast (target of 1,000:1 or greater). In addition, there exists a need for such an improved wire grid polarizer for use at incidence angles of about 45 degrees.

SUMMARY OF THE INVENTION

Briefly, according to one aspect of the present invention a wire grid polarizer for polarizing an incident light beam comprises a substrate having a first surface. A grid or array of parallel, elongated, conductive wires is disposed on the first surface, and each of the adjacent wires are spaced apart on a grid period less than a wavelength of incident light. Each of the wires comprises an intra-wire substructure of alternating elongated metal wires and elongated dielectric layers. The wires can be immersed or imbedded within an overall structure of the wire grid polarizer, to facilitate useful optical devices. Design and fabrication methods for completing these wire grid polarizer devices are also described.

Additionally, as another aspect of the present invention, improved modulation optical systems, comprising a polarization based reflective spatial light modulator, which is generally a liquid crystal display (LCD), an improved wire grid polarization beamsplitter of the present invention, and other polarization optics, are described in various configurations.

BRIEF DESCRIPTION OF THE DRAWINGS

FIGS. 5a–5f are sectional views of various configurations of the wire grid polarizer according to the present invention.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
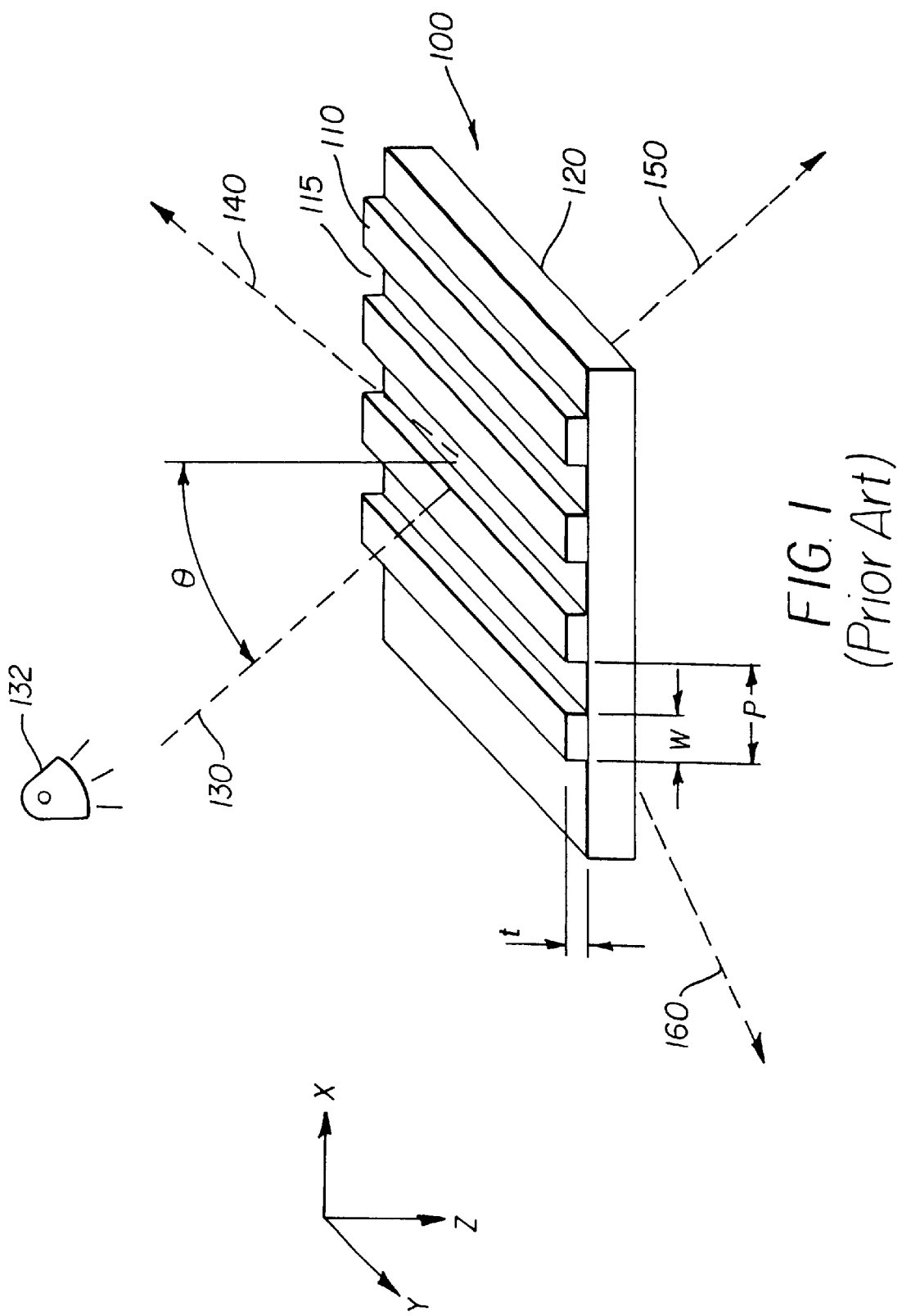
FIG. 1 is a perspective view of a prior art wire grid polarizer.

FIG. 1 illustrates a basic prior art wire grid polarizer and defines terms that will be used in a series of illustrative examples of the prior art and the present invention. The wire grid polarizer 100 is comprised of a multiplicity of parallel conductive electrodes (wires) 110 supported by a dielectric substrate 120. This device is characterized by the grating spacing or pitch or period of the conductors, designated p; the width of the individual conductors, designated w; and the thickness of the conductors, designated t. Nominally, a wire grid polarizer uses sub-wavelength structures, such that the pitch (p), conductor or wire width (w), and the conductor or wire thickness (t) are all less than the wavelength of incident light ($\lambda$). A beam of light 130 produced by a light source 132 is incident on the polarizer at an angle $\theta$ from normal, with the plane of incidence orthogonal to the conductive elements. The wire grid polarizer 100 divides this beam into a specularly reflected light beam 140, and a non-diffracted, transmitted light beam 150. A high order diffracted light beam 160 could also be present, if the incident beam of light 130 contains light of a wavelength that sees the wire grid structure of wires 110 and grooves 115 as a diffraction grating rather than as a sub-wavelength structure. The normal definitions for S and P polarization are used, such that the light with S polarization has the polarization vector orthogonal to the plane of incidence, and thus parallel to the conductive elements. Conversely, light with P polarization has the polarization vector parallel to the plane of incidence and thus orthogonal to the conductive elements.

Figure 2A:
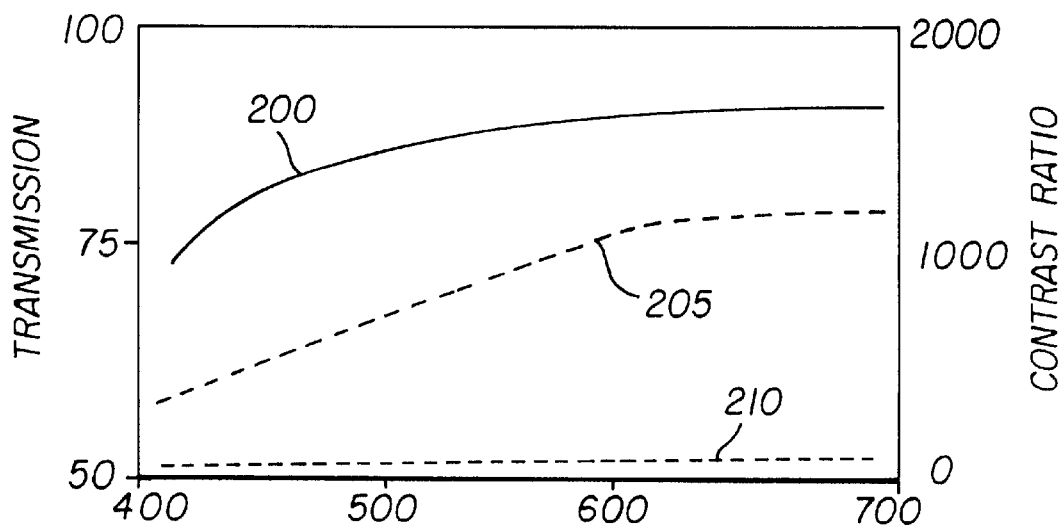
FIGS. 2a and 2b are plots illustrating the relative performance of prior art wire grid polarizers and polarization beamsplitters designed to operate within the visible spectrum.
Figure 2B:
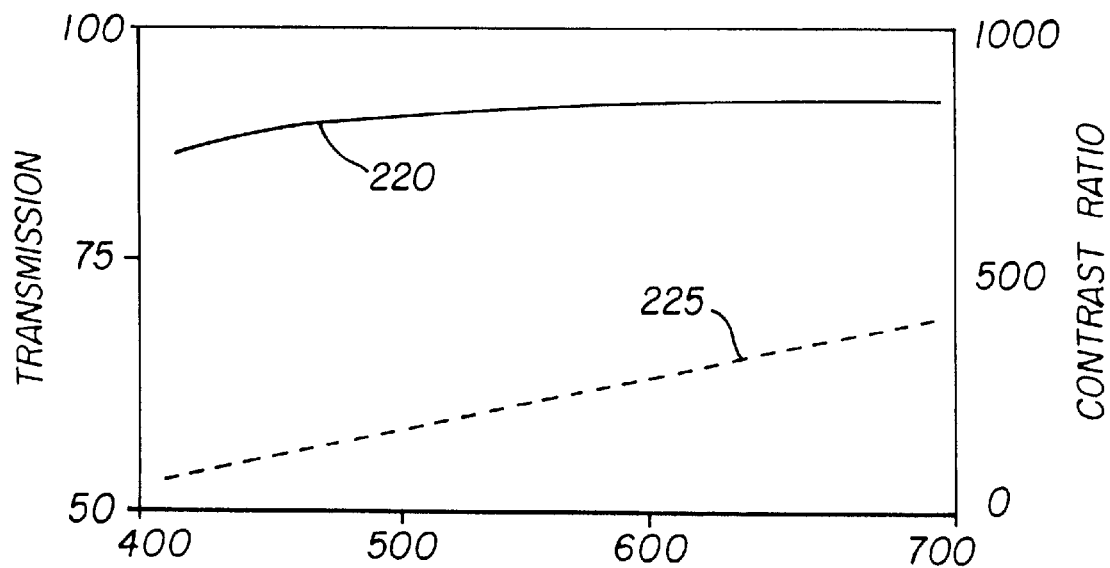

Referring to FIG. 2a there is shown, for wavelengths within the visible spectrum, the transmission efficiency curve 200 and the transmitted "p" polarization contrast ratio curve 205 for a commercially available wire grid polarization beamsplitter from Moxtek Inc. of Orem, Utah. This device is similar to the basic wire grid polarization beamsplitter described U.S. Pat. No. 6,108,131, which has ~130 nm pitch (p~$\lambda$/5) wires (parallel conductive electrodes 110) made with a 40–60% duty cycle (52–78 nm wire width (w)) deposited on a dielectric substrate 120. The solid metal wires are defined to be >20 nm thick, which guarantees sufficient metal thickness that the skin depth ($\delta$) is exceeded for visible wavelengths. This data is representative for this device for a modest NA (numerical aperture) light beam, incident on the wire grid polarizer 100 at an angle of incidence ($\theta$) of 45°. As this device divides the incident beam of light 130 into two outgoing polarized beams (140 and 150), that travel paths spatially distinguishable from the incoming light path, this device is considered to be a polarizing beamsplitter. The transmitted contrast ratio curve 205 measures the average contrast of the transmitted "p" polarized light, relative to the transmitted "s" polarized light (Tp/Ts), where the "s" polarized light is undesirable leakage. Likewise, the reflected contrast ratio curve 210 measures the average contrast of the reflected "s" polarized light relative to the "p" polarized light (Rs/Rp). Referring to FIG. 2b, there is shown for wavelengths within the visible spectrum, the average performance for a commercially available wire grid polarizer 100 from Moxtek for a normally incident ($\theta$=0°) modest NA beam of light 130. In particular, the transmission efficiency curve 220 and the transmitted contrast ratio curve 225, are provided (for "p" polarized light). The performance of both of these devices, which generally provide "p" polarization transmitted beam contrasts >300:1 is quite good, and satisfactory for many applications.

Although the performance curves shown in FIGS. 2a and 2b are very good relative to pre-existing wire grid devices, as well as pre-existing polarizers in general, there is yet room for improvement. In particular, the contrast ratio of the reflected "s" polarized beam is rather low, as measured by the reflected contrast ratio curve 210, for the wire grid polarizing beamsplitter. Polarization contrast is only 10:1 in the blue spectrum (at 450 nm), and even in the red (650 nm), it has risen only to ~40:1. In applications where both the reflected and transmitted beams need good polarization contrast, this performance is insufficient. As an example, in LCD based electronic projection systems, where the projected light is both transmitted through and reflected off of the polarization beamsplitter and where the beams are fast (F/4 or less), the low performance in reflection will require that the system be augmented with additional components. Additionally, while this prior art wire grid polarization beamsplitter provides contrast ~1200:1 in the red, the polarization varies considerably with wavelength, and falls to ~400:1 in the low blue (see again transmitted contrast ratio curve 205 of FIG. 2a).

The performance level of the basic wire grid polarizer can be improved by changing the width of the wires, the thickness of the wires, the pitch of the wires, or any combination of these three. However, these design changes may not necessarily provide contrast ratios desired for the reflected beam or across the required wavelength bands. Moreover, the improvements in wire grid design performance described in U.S. Pat. No. 6,122,103, which broaden the wavelength pass band and increase transmission efficiency by modifying the interaction of the incident light with the dielectric substrate 120 will also not necessarily provide sufficient contrast ratios for broadband visible high contrast applications. The wire grid polarizers of U.S. Pat. Nos. 6,108,131 and 6,122,103, as well as the other cited prior art wire grid device patents only exploit resonance effects within the plane(s) of the elongated wires (X:Y plane of FIG. 1), which comprise the wire grid polarizer or polarization beamsplitter. As the incident light interacts with the wires and the dielectric substrate 120 simultaneously, the structural details at the interface also affect performance (as discussed in U.S. Pat. No. 6,122,103). Thus the plane of the wires should be considered to include the wires themselves as well as the immediate surface and subsurface of the dielectric substrate 120.

Figure 3A:
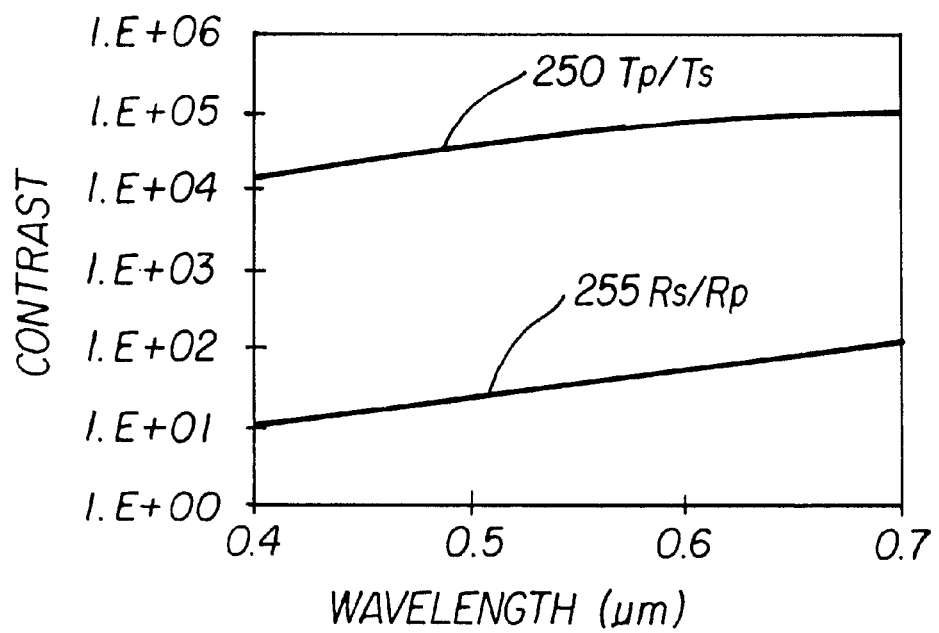
FIGS. 3a and 3b are plots of transmitted, reflected, and overall polarization contrast ratios versus wavelength in the visible spectrum for a wire grid polarization beamsplitter of a type described in the prior art.
Figure 3B:
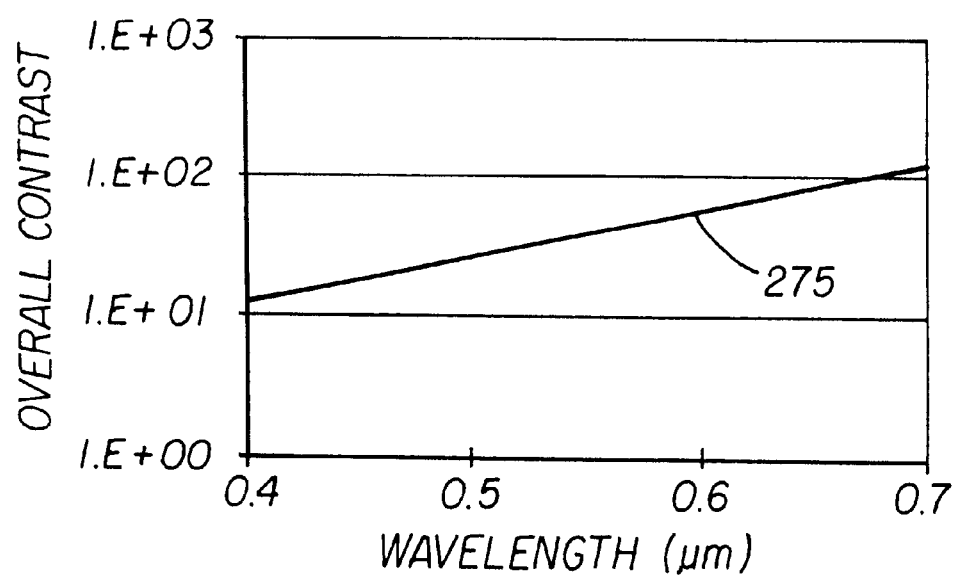

In order to provide a benchmark for the improved devices of the present invention, some prior art devices were analyzed in greater detail. FIG. 3a shows the calculated reflected and transmitted polarization contrast ratios as a function of wavelength for a device similar to the prior art wire grid polarization beamsplitter described in U.S. Pat. No. 6,108,131. This analysis was modeled using the Gsolver grating analysis software tool, which allows sub-wavelength structures to be thoroughly modeled using rigorous coupled wave analysis (RCWA). Gsolver is commercially available from Grating Solver Development Company, P.O. Box 353, Allen, Tex. The wire grid device was modeled as a series of parallel elongated wires formed directly on the transparent glass substrate. The analysis assumes an aluminum wire grid with period p=0.13 μm, conductor width w=0.052 μm (40% duty cycle), conductor thickness t=0.182 μm, and substrate refractive index n=1.525. For simplicity, this analysis only considers a collimated beam incident on the wire grid polarization beamsplitter at an angle θ=45°. FIG. 3a provides the collimated transmitted beam contrast 250 (Tp/Ts) and the collimated reflected beam contrast 255 (Rs/Rp). The calculated transmitted beam contrast 250 ranges from $10^4$–$10^5$:1 across the visible spectrum, which is much greater than the ~1,000:1 levels reported for the actual device, as shown in FIG. 2a. However, plot 250 of FIG. 2a represents the angle averaged performance of an actual device, while plot 250 of FIG. 3a represents the theoretical performance of a collimated beam though a perfect device. FIG. 3a also shows the theoretical reflected beam contrast 255 as modeled for this prior art type wire grid devices. The calculated theoretical reflected beam contrast ranges from ~10:1 to ~100:1 over the visible spectrum, and is only marginally better than the reflected beam contrast 255 given in FIG. 2a for an actual device. FIG. 3b shows a plot of the theoretical overall contrast 275, where the overall contrast C is calculated as:

$$C=1/((1/Ct)+(1/Cr))  \quad (3).$$

The overall contrast C, which combines the contrast of the transmitted light beam 150 ("p" polarization) with the contrast of the reflected light beam 140 ("s" polarization), can be seen to be mostly determined by the lowest contrast ratio, which is the contrast for the reflected light beam. Thus, the overall contrast of the prior art type device per U.S. Pat. No. 6,108,131 is limited by the "s" polarization reflected beam, and is only ~10:1 to ~100:1 within the visible spectrum, with the lowest performance for blue wavelengths.

Figure 4:
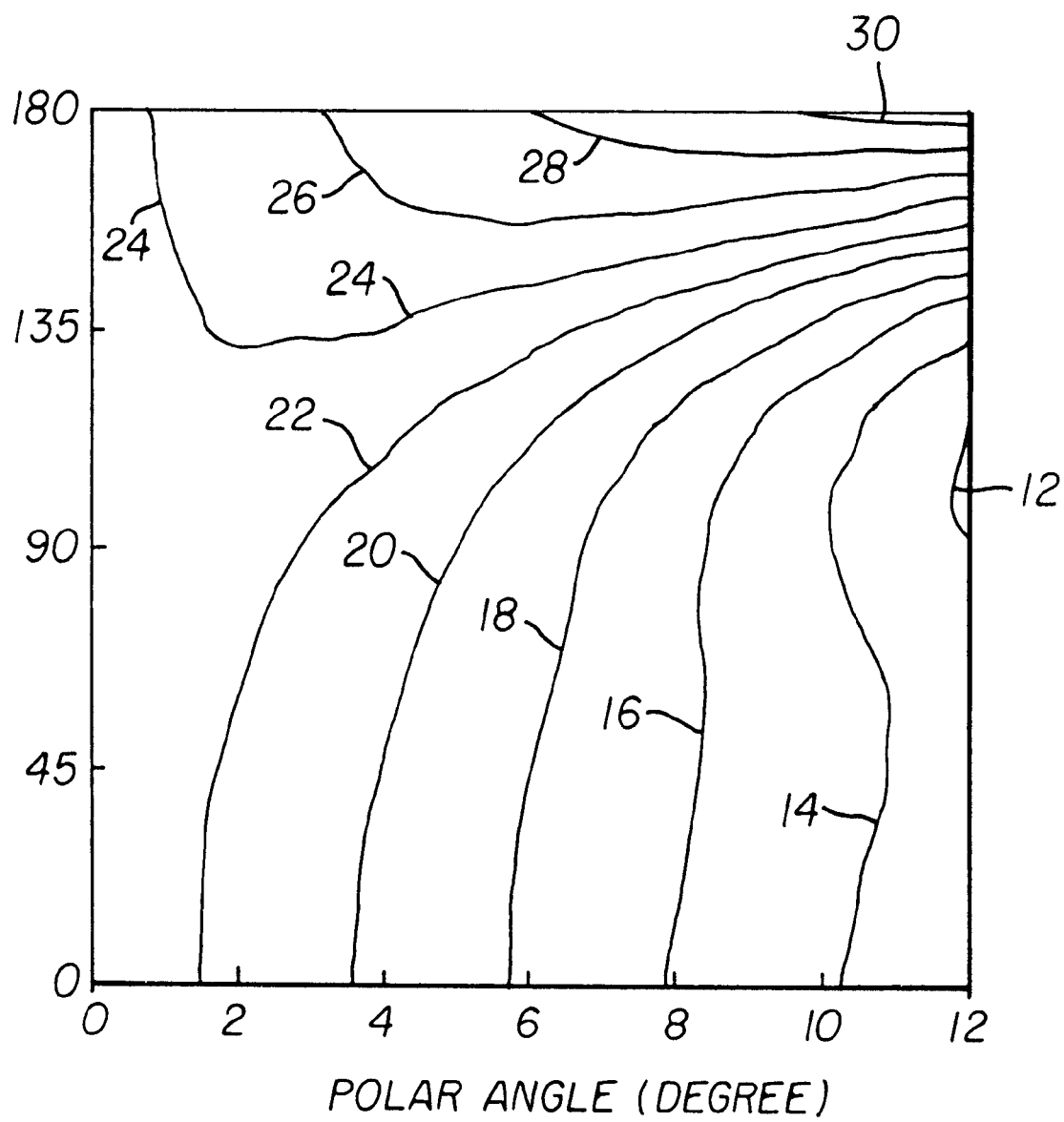
FIG. 4 is a contour plot of the overall contrast versus angle of incidence for 500 nm light for a wire grid polarization beamsplitter of a type described in the prior art.

FIG. 4 shows the modeled variation of the overall contrast ratio C as contour lines versus angle at 500 nm for this same prior art type device (0,0 coordinate corresponds to 45°). This shows that the overall contrast ratio 275 varies significantly with incidence angle, from ~23:1 at 45° incidence, to ~14:1 at ~55° incidence (polar angle+10 ) to ~30:1 at ~35° incidence (polar angle+10°, azimuthal angle 180°). Thus, FIG. 4 effectively shows how the overall contrast ratio is average lower by having large NA incident beams of light. Of course, the overall contrast C is limited by the reflected contrast (Rs/Rp). A similar analysis of just the transmitted beam contrast (Tp/Ts) versus angle shows the contrast contour lines follow a "Maltese Cross" pattern, with very high contrast values (>$10^4$:1) only in a very narrow angular range, while average contrast values of ~800:1 can be found within a fairly wide (>12°polar, 25° azimuthal) angular range. The light efficiency was also modeled with Gsolver, basically verifying the transmission efficiency curve 200 of FIG. 2a. The transmission efficiency for "p" polarized light was fairly uniform ~87% across most of the visible spectrum, while the reflected "s" light efficiency was a very uniform ~92% across the visible spectrum.

Wire grid polarizer 300 of the present invention, as shown as a sectional view in FIG. 5a, employs a construction wherein each of the elongated composite wires 310 (or parallel conductive electrodes) has a stratified internal structure comprised of a series of multiple elongated metal wires (320, 322, 324) and alternating elongated dielectric strips (dielectric layers 340, 342, 344) deposited on a transparent dielectric substrate 305. By properly constructing the composite wires 310 of the wire grid polarizer, with the respective thickness of the metal wires and the dielectric layers properly defined, a combination of photon tunneling and the intra-grid resonance effects can be exploited to enhance the performance of the polarizer. In contrast to the prior art wire grid polarizers, the wire grid polarizers of the present invention not only uses resonance effects within the plane (X:Y plane) of the elongated wires, but also uses resonance effects between multiple parallel intra-wire planes along the Z axis to define and enhance the performance. It should be understood that the wire grid polarizers 300 depicted in FIG. 5a–5d are not to scale illustrations, and the composite wires 310 are exaggerated to show the intra-wire substructure of elongated metal wires alternating with dielectric layers. As previously, with the prior art wire grid devices, the pitch (p) and the wire width (w) are sub-wavelength in dimension (~λ/5 or smaller). The wire thickness (t) is also nominally sub-wavelength as well, although not necessarily so, as will be discussed.

In particular, the design of the wire grid polarizers of the present invention is based upon the use of a little known physical phenomena, resonance enhanced tunneling, in which properly constructed metal layers can be partially transparent to incident light. This phenomena, which occurs when a photonic band gap structure is constructed which enables resonance enhanced tunneling, is described in the literature, for example in a survey article "Photonic Band Gap Structure Makes Metals Transparent" in OE Reports, December 1999, pg. 3. The concepts are also described in greater detail in the article "Transparent, Metallo-Dielectric, One-Dimensional, Photonic Band-Gap Structures" in J. App. Phys. 83 (5), pp. 2377–2383, Mar. 1, 1998, by M. Scalora et al.

Traditionally, incident light is considered to only propagate through a metal film only a short distance, known as the skin depth (δ), before reflection occurs. Skin depth can be calculated by equation (4) as follows:

$$\delta=\lambda/4\pi n_i, \quad (4)$$

where the calculated depth corresponds to the distance at which the light intensity has decreased to ~$1/e^2$ of its value at the input surface (where $n_i$ is the imaginary part of the refractive index). Traditionally, thin metal layers are considered opaque relative to transmitted visible light when their thicknesses exceed the typical skin depth values δ, of only 10–15 nm, for metals such as aluminum and silver. However, as these articles describe, a metallo-dielectric photonic band gap structure can be constructed with alternating layers of thin metal sheets and thin dielectric sheets, such that the incident light can be efficiently transmitted through individual metal layers which are thicker than the skin depth δ. (By definition, a photonic band gap structure is a nanoscopic structure with alternating layers of materials or sections of similar thicknesses having different indices of refraction which are periodically or quasi-periodically spaced on a substrate or other structure, such that a range of wavelengths is transmitted (or blocked) by the structure.) Most simply, these structures can be imagined by considering any single composite wire 310 of FIG. 5a, and its constituent alternating metal wires (320, 322, 324) and dielectric layers (340, 342, 344) as being stretched into a sheet to cover much of the two dimensional surface of the dielectric substrate 305. For example, one three period structure described in these articles, which has three 30 nm thick aluminum (Al) layers separated by three 140 nm thick magnesium fluoride layers (MgF2), provides a variable 15–50% transmission in the green wavelength band. In effect, incident light tunnels through the first thin metallic layer, and evanescently encounters the following dielectric layer. The light transmitted through the first metal layer into the following dielectric layer encounters the second metal layer. The proper boundary conditions are then established such that the overall structure acts much like a Fabry-Perot cavity (or Etalon) and resonance in the dielectric layer enhances light transmission through the metal layers. The resonance enhanced tunneling effect is then further enhanced by the repeated design of the structure, with alternating thin metallic and thin dielectric layers. Indeed, these articles show that adding more periods (and thus adding to the total metal thickness) can increase total light transmission versus structures with fewer periods, as well as reduce the oscillations within the bandpass region. Furthermore, it is shown that adjustment of the dielectric layer thicknesses can shift the edges of the bandpass structure towards longer or shorter wavelengths, depending on the changes made. Typically, the thin dielectric layers in these structures are significantly thicker than the thin metal layers (~3–10× or greater), while the thin metal layers may be only a skin depth thick, but may also be several times thicker than the theoretical skin depth (δ).

This resonance enhanced tunneling phenomena which is possible with metallo-dielectric photonic bandgap has not been widely used in practical devices. In the cited literature references, this effect is considered useful for light shielding devices, which transmit one wavelength band (the visible for example), while blocking nearby bands (UV and IR). Indeed, such a photonic bandgap structure can provide suppression of nearby wavelength bands which is orders of magnitude improved over that of a simple metallic film. Additionally, U.S. Pat. No. 5,751,466 (Dowling et al.) and U.S. Pat. No. 5,907,427 (Scalora et al.) describe use of this effect to design variable photonic signal delay devices for optical telecommunications. However, the prior art does not foresee the benefit of applying the resonance enhanced tunneling of metallo-dielectric photonic bandgap structures to the design of polarization devices generally, or to wire grid polarizers and polarization beamsplitters in particular. Moreover, it is not necessarily clear that the resonance enhanced tunneling effect would improve the performance of a wire grid polarization device by improving polarization contrast or transmission across the entire visible spectrum, or even any single color band.

Accordingly, the wire grid polarizers 300 of the present invention, as depicted in FIGS. 5a–5d, use a plurality of identically fabricated elongated composite wires 310, each with an intra-wire substructure comprising alternating metal wires (320, 322, 324) and dielectric layers (340, 342, 344). As with the prior art wire grid polarizers, light of the polarization parallel to the wires is reflected off the device, and light of polarization orthogonal to the wires is transmitted. However, where the prior art wire grid polarizers use relatively thick wires, of monolithically deposited metal typically 100–150 nm thick, the wire grid polarizers of the present invention effectively constructs each wire as a series of alternating thin metal layer and dielectric layers. As a result, the incident light of polarization orthogonal to the wires is transmitted in part through the metallic layers themselves by photonic tunneling and enhanced resonance effects, and thus the overall contrast ratio of the transmitted polarized light versus the reflected polarized light is enhanced. As compared to the prior art wire grid polarization devices, which rely only on resonance effects within the plane of the wires (the X:Y plane of FIG. 1), the wire grid polarization devices of the present invention also use resonance effects in the orthogonal direction (the Z direction of FIG. 1) to determine the performance.

The first example of a wire grid polarizer 300 of the present invention is shown in FIG. 5a, wherein each elongated composite wire 310 has a periodic stratified intra-wire structure 315 of six layers comprising alternating layers of metal (metal wires 320, 322, 324) and dielectric (dielectric layers 340, 342, 344). As with the prior art devices, wire grid polarizer 300 was modeled as a structure with the wires located on a 130 nm pitch (p~λ/5), with a duty cycle of 40%, such that the width (w) of the wires is 52 nm. Thus, grooves 312 between composite wires 310 are 78 nm wide. Grooves 312 are nominally filled with air, rather than some other medium, such as an optical liquid or gel. Likewise, as with the prior art type device, this device was modeled as a polarization beamsplitter, with a collimated beam incident at an angle θ=45°. Additionally, composite wires 310 were modeled with an intra-wire structure 315 comprising three thin dielectric layers (dielectric layers 340, 342, 344) of MgF2, each 33 nm thick, alternating with three thin metal layers (metal wires 320, 322, and 324) of aluminum, each 61 nm thick.

Figure 5E:
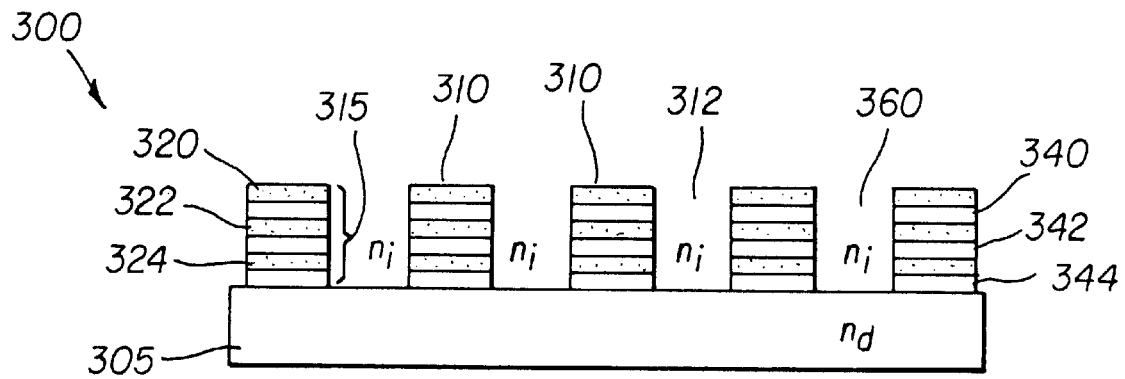
Figure 6A:
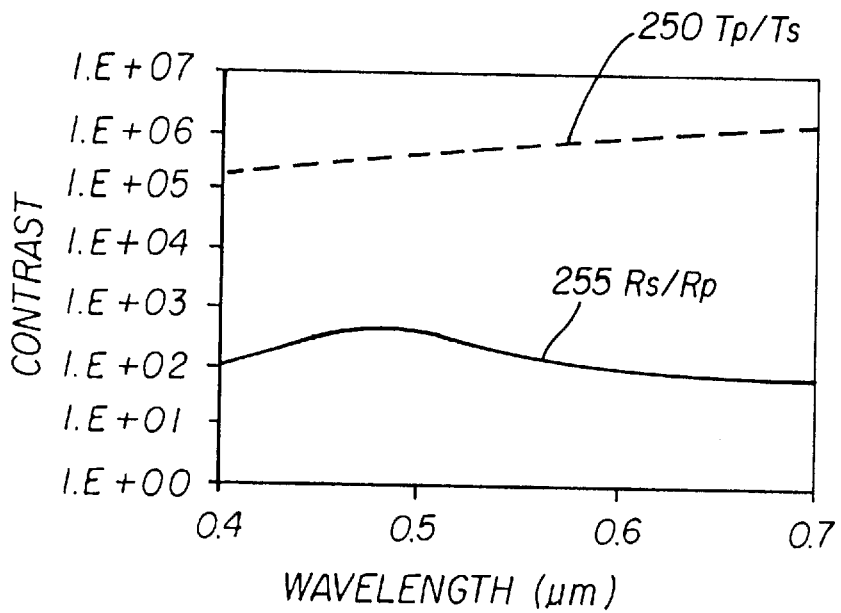
FIGS. 6a and 6b are graphical plots illustrating a reflected and transmitted polarization contrasts ratio versus wavelength, and the overall contrast ratio versus wavelength for a wire grid polarizer of the present invention, wherein the device has a six layer structure.
Figure 6B:
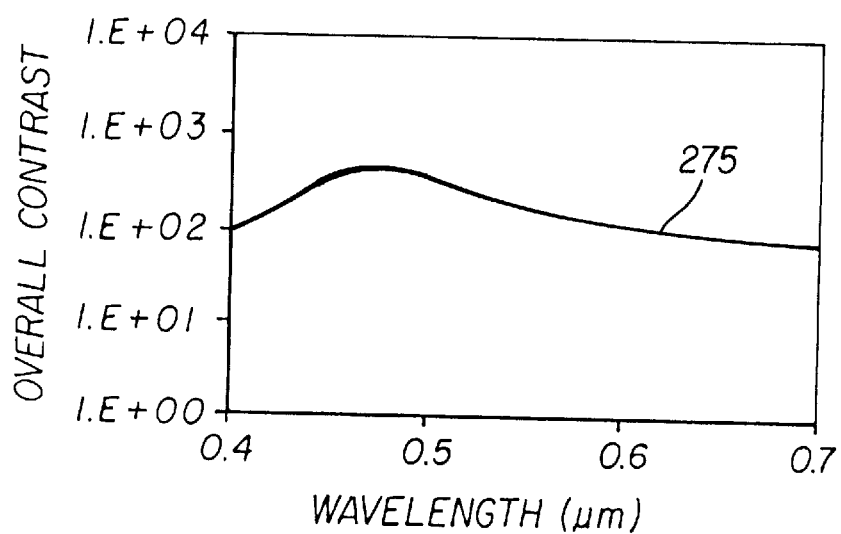

According to the effective medium theory, incident light interacts with the effective index of each layer, where the effective index depends on the geometry of the composite wires 310, the geometry of the layer itself, the complex refractive index of the layer (either metal or dielectric), the refractive index of the material between the wires (air), and the boundary conditions established by the adjacent layers. As shown in FIG. 5a, for this example of wire grid polarizer 300, the intra-wire structure is designed such that the third dielectric layer 344 is located in between the third metal wire 324 and surface 307 of transparent dielectric substrate 305. The total wire thickness (t) of the composite wires 310, which is the sum of the thicknesses of the three metal wires 320, 322, and 324 and the three dielectric layers 340, 342, 344, is 282 nm or (~λ/2). The modeled polarization performance for this device, which is shown in FIGS. 6a and 6b, is an improvement in both reflection and transmission to the basic wire grid polarizer whose modeled results were given in FIGS. 3a and 3b. Performance was modeled with Gsolver, using 8 diffraction orders, to ensure accuracy. As shown in FIG. 6a, the theoretical transmitted beam contrast 250 for "p" light varies from $10^5$–$10^6$:1 across the visible spectrum, while the reflected beam contrast 255 for "s" light averages a fairly uniform ~100:1 across the visible spectrum. Thus, the overall contrast ratio 275, shown in FIG. 6b, also averages ~100:1 across the entire visible spectrum. The improved polarization performance is not gained at the cost of efficiency, as the "s" light reflection efficiency is ~91%, while the "p" light transmission efficiency is ~83%, with little variation across the visible spectrum. With such a relatively high and uniform polarization contrast for the reflected "s" polarization light, this device could provide improved performance as a polarization beamsplitter, in applications where both "p" and "s" polarized beams are to be used. Notably, this device also shows a ~10× improvement in the "p" polarized light contrast (also known as polarization extinction ratio) over the prior art device of U.S. Pat. No. 6,108,131, as well as an enhanced blue performance, with the reflected beam contrast 255 and the overall contrast ratio 275 averaging ~250:1 contrast over most of the blue spectrum. Such performance could be useful in many applications, including projection systems.

Additionally, the improvements in overall contrast 275 and transmitted beam contrast 250 of the first example wire grid polarization beamsplitter device, as shown in FIGS. 6a,b, when compared to the prior art type device, as shown in FIGS. 3a and 3b, do not come at the cost of reduced angular performance. A contour plot analysis of the overall contrast C showed that average contrast values of 500:1 are obtained within a wide angular swath (+/−12° polar, and +/−30° azimuthal) at 500 nm. This first example device was also modeled for a collimated beam at a normal incidence ($\theta$=0°). As the transmitted beam contrast over the entire visible spectrum >105:1 at normal incidence, the first example wire grid polarizer was proven to function well as a polarization analyzer or polarizer, and not just as a wire grid polarization beamsplitter.

While both the present invention for a wire grid polarizer and the wire grid polarizer of Garvin et al. in U.S. Pat. No. 4,289,381, both have multiple planes of patterned wires extending in the Z axis direction, these wire grid polarizer devices are distinctly different. In particular, the wires in each of the multiple wire grid planes of U.S. Pat. No. 4,289,381 are thick (100–1000 $\mu$m) solid metal wires, which lack intra-wire substructure and which are too thick for useful evanescent transmittance through the wires. Additionally, the multiple wire planes for the two grid case of U.S. Pat. No. 4,289,381 preferentially have a half pitch offset (p/2) rather than having an overlapped alignment. Finally, the U.S. Pat. No. 4,289,381 wire grid polarizer design preferentially locates adjacent wire grids with an inter-grid spacing (1) and pitch offset (p/2) so as to avoid the occurrence of inter-grid resonance or Etalon effects. In contrast, the wire grid polarizers 300 of the present invention specifically use Etalon type resonance effects within stratified intra-wire substructure in order to enhance performance.

Figure 7A:
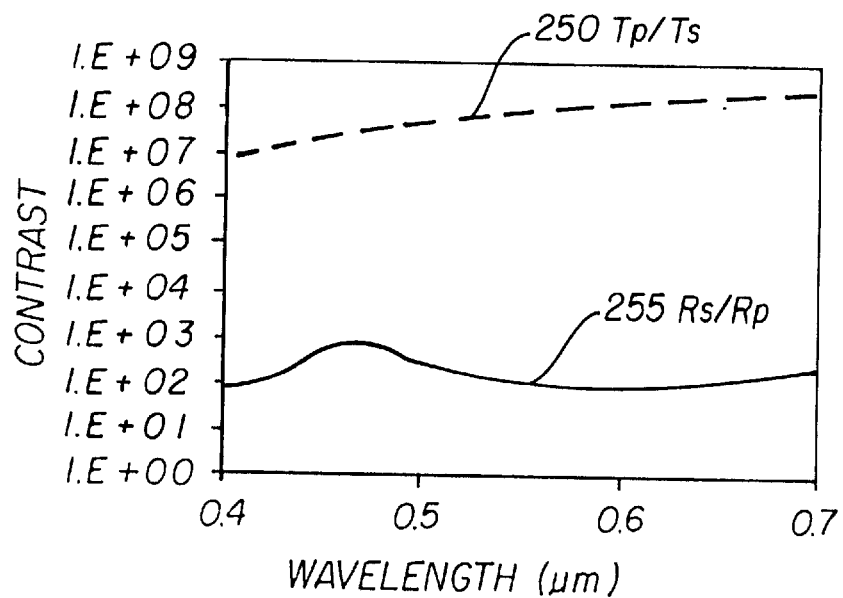
FIGS. 7a–7d are graphical plots illustrating a reflected and transmitted polarization contrasts ratio versus wavelength, and the overall contrast ratio versus wavelength for a wire grid polarizer of the present invention, wherein the device has an eighteen layer structure.
Figure 7B:
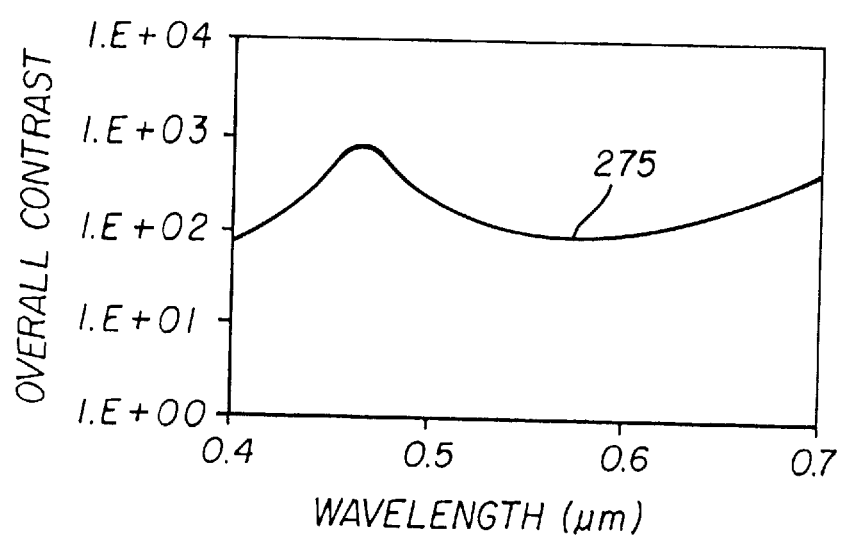

The second example of a wire grid polarizer 300 of the present invention is shown in FIG. 5b, wherein each composite wire 310 has a periodic stratified intra-wire structure 315 of eighteen layers comprising alternating layers of metal (metal wires 330a–i) and dielectric (dielectric layers 350a–i). As with the first example device, the second example wire grid polarizer 300 was modeled as a structure 130 nm pitch (p~$\lambda$/5) composite wires 310, with a 40% duty cycle wire width (w) of 52 nm. Likewise, as before, the device was modeled as a polarization beamsplitter, with a collimated beam incident at an angle $\theta$=45°. As previously, the final dielectric layer (330i) is adjacent to the dielectric substrate 305. However, composite wires 310 were modeled with an intra-wire structure 315 comprising nine thin MgF2 dielectric layers (dielectric layers 330a–i), each 39 nm thick, alternating with nine thin aluminum metal layers (metal wires 350a–i), each 17 nm thick. The total wire thickness (t) of composite wires 310, which is the sum of thicknesses of metal wires 330a–i and dielectric layers 350a–i is 504 nm, which is ~1$\lambda$. The modeled polarization performance for this device, which is shown in FIGS. 7a and 7b, is an improvement in both reflection and transmission to the basic wire grid polarizer whose modeled results were given in FIGS. 3a and 3b. As shown in FIG. 7a, the theoretical transmitted beam contrast 250 for "p" light varies from $10^7$–$10^8$:1 across the visible spectrum, while the reflected beam contrast 255 for 's"light averages ~100:1 across the visible spectrum. Thus, the overall contrast ratio 275, shown in FIG. 7b, also averages ~100:1 across the entire visible spectrum. While this device is significantly more complicated than the first example device, the theoretical transmitted beam contrast 250 for "p" polarized light is ~100× better than the first example device, and ~1,000× better than the prior art type device (see FIG. 3a).

Figure 7C:
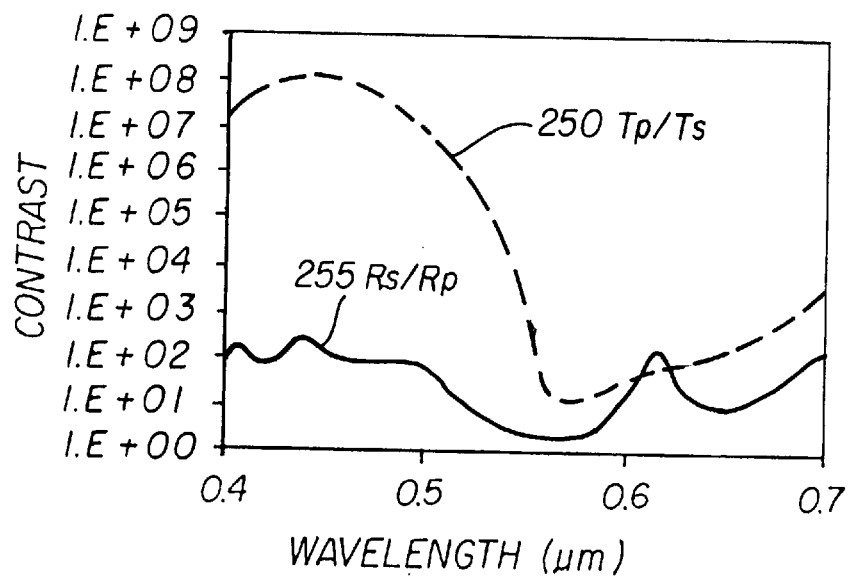
Figure 7D:
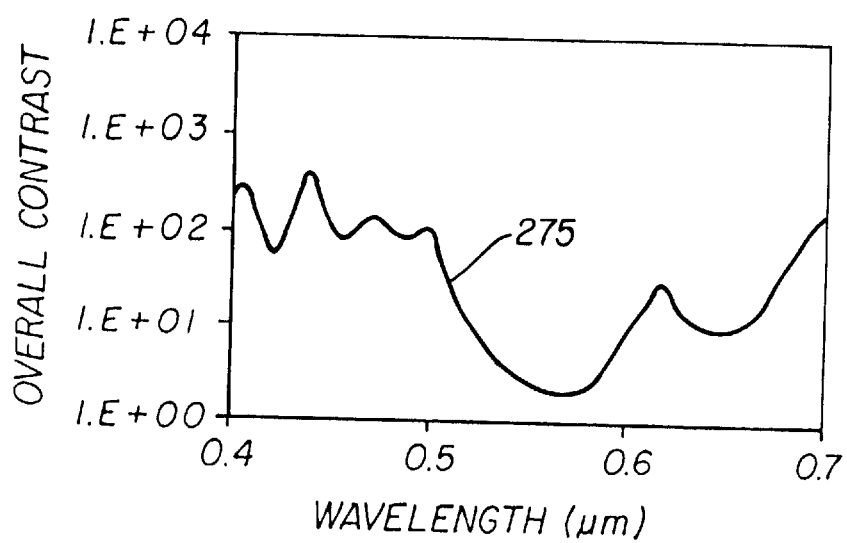

The third example of a wire grid polarizer 300 of the present invention is an eighteen layer structure similar to that of the second example, shown in FIG. 5b, with each composite wire 310 having a periodic stratified intra-wire structure 315 of eighteen layers comprising alternating layers of metal (metal wires 330a–i) and dielectric (dielectric layers 350a–i), except that the thicknesses of the dielectric and metal layers have been changed. In this case, composite wires 310 were modeled with an intra-wire structure 315 comprising nine thick MgF2 dielectric layers (dielectric layers 330a–i), each 283 nm thick, alternating with nine thin aluminum metal layers (metal wires 350a–i), each 17 nm thick. The total wire thickness (t) of composite wires 310 is 2700 nm, which is ~5$\lambda$. As shown in FIGS. 7c and 7d, as compared to FIGS. 7a and 7b, the third device has significantly different polarization performance as compared to the second device, although the only change was in the thickness of the dielectric layers 350a–i. As evident in FIG. 7d, the overall contrast ratio 275 has an average contrast ratio in the blue spectrum of ~150:1, while performance in the green and red spectra have degraded. The plot of overall contrast ratio 275 is also noteworthy for its rapid oscillations in the blue wavelength band, which swing, peak to valley, between ~50:1 and ~500:1 contrast. This example, which uses thick dielectric layers, suggests that the potential to design wavelength band tuned wire grid polarization beamsplitters which have not only excellent performance for the "p" transmitted light, but very good performance (250:1 or better) for the "s" reflected light. Unfortunately, while Gsolver is a superior analysis software program, the code was not written to facilitate polarization contrast optimization, so an exemplary result with further improved performance is not available. However, optimization of this design, allowing the thicknesses of the metal layers and the dielectric layers to vary, creating aperiodic or doubly periodic structures, could boost the performance further in the blue, to provide the desired result.

Figure 8A:
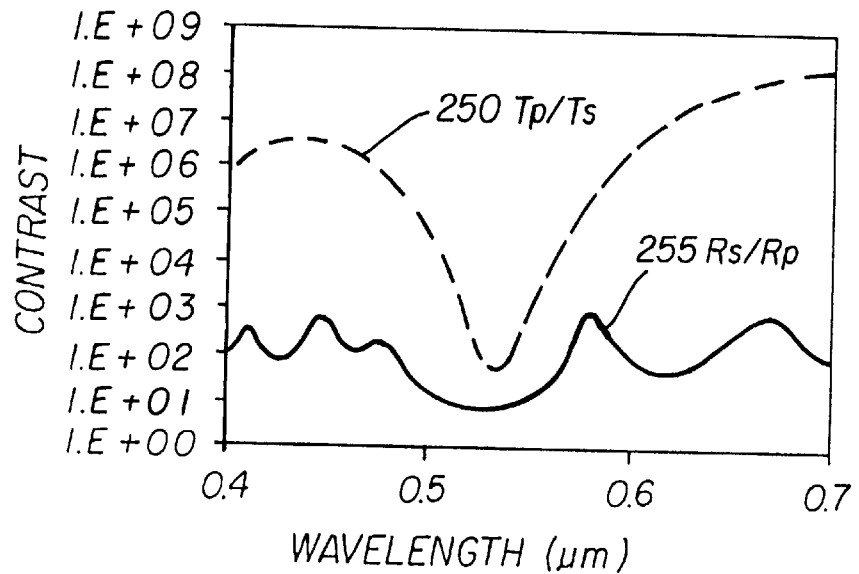
FIGS. 8a and 8b are graphical plots illustrating a reflected and transmitted polarization contrasts ratio versus wavelength, and the overall contrast ratio versus wavelength for a wire grid polarizer of the present invention, wherein the device has an alternate eighteen layer structure.
Figure 8B:
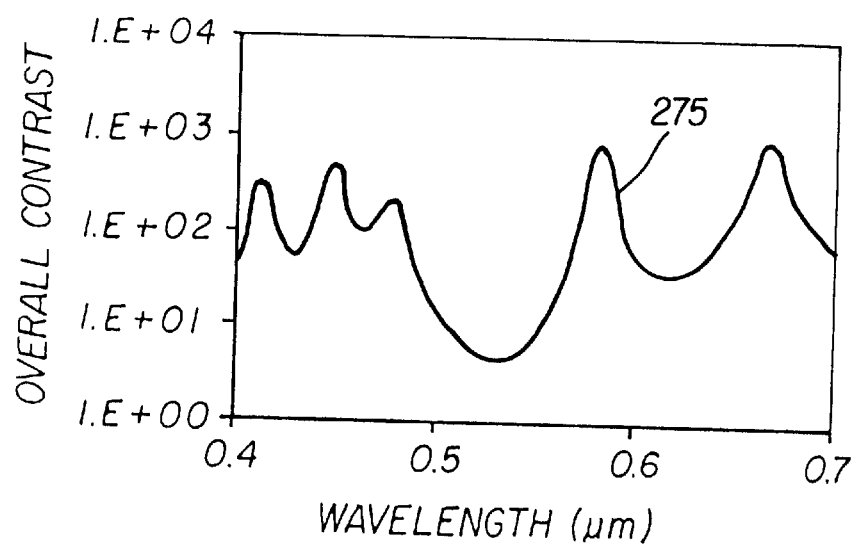

It should be noted that similar results to the third example design of a wire grid polarizer 300 can be obtained using similar intra-wire structures 315 with thick dielectric layers, but with other than eighteen total layers. The fourth example, not shown, wire grid polarizer was modeled with a structure comprising eight layers, wherein four layers of MgF2, each 525 nm thick, alternate with four layers of aluminum, each 45 nm thick. Thus the total thickness (t) of the composite wires 310 is 2.28 µm, or ~4λ. The modeled device is otherwise the same as the devices of the prior examples, relative to wire pitch (p), wire width (w), and angle of incidence. The resulting polarization performance for this fourth example device, as shown in FIGS. 8a and 8b, is very similar to that of the third example device (FIGS. 7c and 7d) in blue spectrum. Interestingly, FIG. 8a suggests the potential for a structure with a high contrast in the blue and red spectra for both the transmitted and reflect beams, while giving low contrast for both beams in the green spectrum.

Relative to the second and third examples of eighteen layer wire grid polarizers, which only vary in design according to the thickness of the dielectric layers (39 nm versus 283 nm), other interesting results can be obtained by modeling similar devices with intermediate dielectric layer thicknesses. For example, a modeled device with 56 nm dielectric layer thicknesses provides a minimum ~100:1 overall contrast ratio over the entire visible spectrum, but also provides two localized peaks, at ~450 nm and ~610 nm, where overall polarization contrast is ~1000:1 or greater.

Figure 9A:
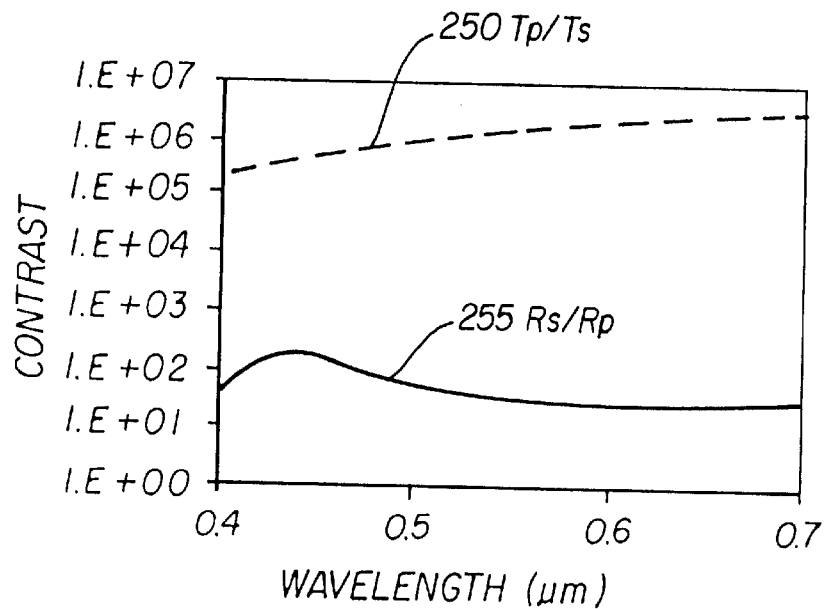
FIGS. 9a and 9b are graphical plots illustrating a reflected and transmitted polarization contrasts ratio versus wavlength, and the overall contrast ratio versus wavelength for a wire grid polarizer of the present invention, wherein the device has a five layer structure.
Figure 9B:
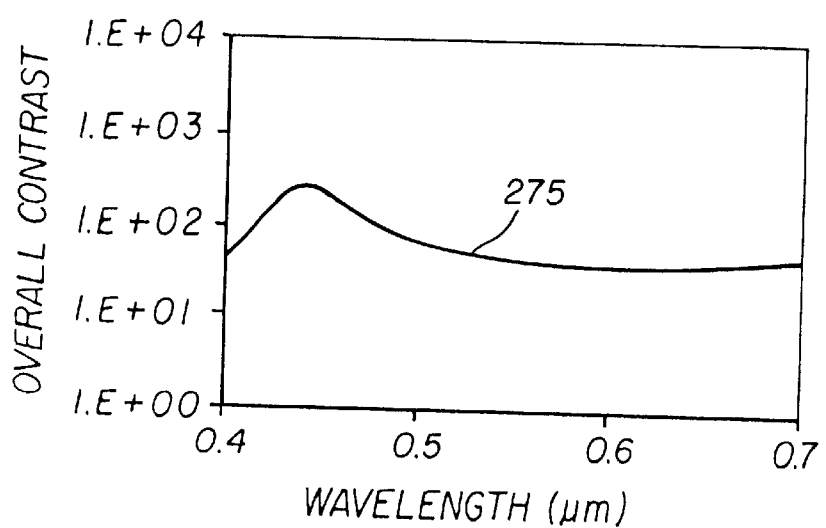

The fifth example of a wire grid polarizer 300 of the present 10 invention is shown in FIG. 5c, where each composite wire 310 has a periodic stratified intra-wire structure 315 of five layers comprising alternating layers of metal (metal wires 320, 322, and 324) and dielectric (dielectric layers 340 and 342). As with the other exemplary devices, the fifth example wire grid polarizer 300 was modeled as a structure 130 nm pitch (p~λ/5) composite wires 310, with a 40% duty cycle wire width (w) of 52 nm. Likewise, as before, the device was modeled as a polarization beamsplitter, with a collimated beam incident at an angle θ=45°. However, this device has an intra-wire structure 315 which is designed with a metal layer (metal wire 324) adjacent to the dielectric substrate 305, rather than a dielectric layer as in the previous examples. Composite wires 310 were modeled with an intra-wire structure 315 comprising two thin MgF2 dielectric layers (dielectric layers 340 and 342, each 55 nm thick, alternating with three thin aluminum metal layers (metal wires 320, 322, and 324), each 61 nm thick. The total wire thickness (t) of composite wires 310 is 293 nm, which is λ/2. Although the modeled polarization performance for this device, which is shown in FIGS. 9a and 9b, is an improvement in both reflection and transmission to the basic wire grid polarizer (shown in FIGS. 3a and 3b), this five layer device does not perform as well as the six layer device of the first example. As shown in FIG. 7a, the theoretical transmitted beam contrast 250 for "p" light varies from $10^5$–$10^6$:1 across the visible spectrum, while the reflected beam contrast 255 for 's" light averages only ~40:1 across the visible spectrum. Thus, the overall contrast ratio 275, shown in FIG. 7b, also averages ~40:1 across the entire visible spectrum. Additionally, the blue performance is less uniform across its wavelength band, as compared to the first example device. Nonetheless, this device, with a metal layer (wire 324) in contact with the dielectric substrate 305, is still useful.

Figure 10A:
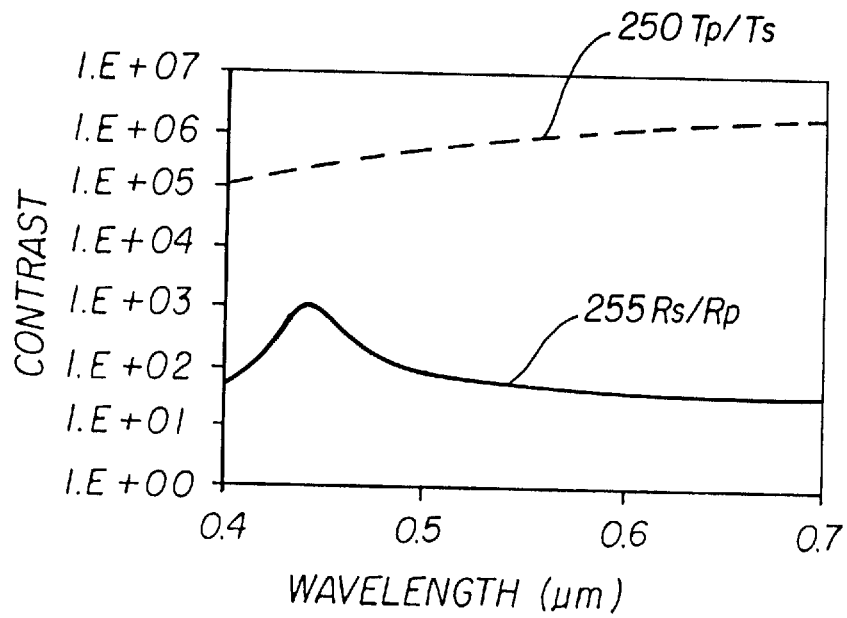
FIGS. 10a and 10b are graphical plots illustrating a reflected and transmitted polarization contrasts ratio versus wavelength, and the overall contrast ratio versus wavelength for a wire grid polarizer of the present invention, wherein the device has an alternate five layer structure.
Figure 10B:
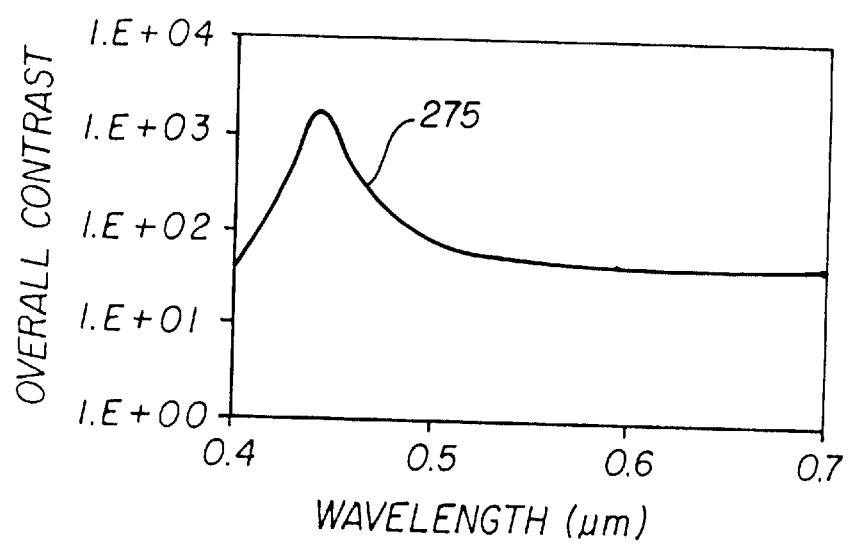

The sixth example of a wire grid polarizer 300 of the present invention, as shown in FIG. 5d, is a variation of the fifth example device which has only five layers within each composite wire 310, where the sixth example device has an aperiodic stratified intra-wire structure 315. Thus, composite wires 310 were modeled with an intra-wire structure 315 comprising three thin aluminum metal layers (metal wires 320, 322, and 324), each 61 nm thick, alternating with two thin MgF2 dielectric layers, where dielectric layers 340 is 27.5 nm thick, while dielectric layer 342 is 82.5 nm thick. As before, the third metal layer 324 is in contact with the dielectric substrate 305. As with the fifth example device, the total wire thickness (t) for this device is 293 nm. The modeled performance of this device, as shown in FIGS. 10a and 10b, is similar to that of the fifth example device (see FIGS. 9a and 9b), except that the performance in the blue spectrum is higher on average, as measured by the overall contrast 275. The fifth and sixth example device are again suggestive of the potential for wavelength band tuned wire grid polarizer devices.

Graphs of light efficiency, as measured by the "s" polarization reflection efficiency and "p" polarization transmission efficiency for the various examples (one to six) were not provided, as the data changed minimally. In general, the reflection efficiency for "s" polarized light was uniform across the visible spectrum, at levels in the upper 80's to lower 90's for percent efficiency. The "p" polarization transmission efficiency was a bit less uniform, as some exemplary devices showed some fall-off in the low blue region of the spectrum. Also, the overall "p" polarization transmission efficiency was lower than the "s" light efficiency, and generally was in the lower to middle 80's for percent efficiency.

It should be understood that each elongated composite wire 310 has a length that is generally larger than the wavelength of visible light. Thus, the composite wires 310 have a length of at least approximately 0.7 µm. However, in most practical devices, the composite wires 310 will be several millimeters, or even several centimeters in length, depending on the size requirements of the application. While the various exemplary wire grid polarizer devices of the application are modeled with a duty cycle of 40% relative to the width (w) of the composite wires 310 as compared to grid pitch or period (p), it should be understood that other duty cycles can be used. Generally, duty cycles in the range of 40–60% will provide the optimum overall performance relative to transmission and contrast ratio. It is noteworthy, as illustrated by the exemplary devices, that the total thickness (t) of the composite wires 310 can vary from approximately a half-wave to approximately five waves while still providing exceptional transmission of the transmitted "p" polarized light and rejection of the "s" polarized light. On the other hand, current device fabrication process methods may limit the achievable aspect ratio (thickness (t) to width (w)) for the composite wires 310. As a result, practical devices in the visible spectrum may be limited to total thicknesses (t) of only ~100–300 nm range (~λ/6 to ~λ/2). Thus, a total wire thickness limitation could constrain the solution space and design freedom for possible designs based on composite wires 310 with a stratified intra-wire structure 315 of alternating metal wire and dielectric layers, but nonetheless, even in a limited solution space, advantaged designs can be found. By comparison, prior art wire grid devices largely rely on the thickness of the metal wires being thicker than several skin depths (δ) in order to ensure good rejection of the "s" polarized light. Furthermore, it is noteworthy that the exemplary devices of this application may have thicknesses of the elongated metal wires (330, for example), which are only several (approximately 1–4) skin depths thick and still provide exceptional transmission of the transmitted "p" polarized light and rejection of the "s" polarized light. For example, the fifth example device uses multiple metal layers each of which are 61 nm thick, which is equivalent to approximately four skin depths. Finally, the second or opposite surface of the dielectric substrate 120 could have a anti-reflection (AR) coating to enhance overall transmission.

It should be understood that these various examples for designs of wire grid polarizers 300 with stratified intra-wire grid structures 315 comprising multiple alternating metal and dielectric layers do not encompass the entire range of possible designs. For one thing, the limitations of the Gsolver software, which does not allow optimization of polarization contrast, constrained the presented results to less than their potential. Also, other combinations of materials could be used in the designs, including replacing aluminum with gold or silver, or replacing dielectric material MgF2 with SiO2 or TiO2, for example. Actual materials choices will depend both on the desired design performance as well as process constraints. It should also be understood that although all the exemplary devices were designed with the outmost (furthest from the dielectric substrate 305) layer which comprises a portion of the intra-wire structure 315 of composite wires 310 as a metal layer, that alternately a dielectric layer could be used as the outmost layer.

Additionally, it is possible to design devices where grooves 312 are filled with an optically clear liquid, adhesive, or gel, rather than with air. This is illustrated in FIG. 5e, where an optical material of refractive index $n_i$ is a dielectic fill 360 which is formed in the grooves 312. For example, the dielectric fill 360 may be the same dielectric material that is used to form the dielectric layers 340, 342, 344, which partially comprise composite wires 310. The resulting wire grid polarizer 300 is effectively immersed, with the benefit that the composite wires 310 are protected (from oxidation, for example) by the dielectric fill 360.

Figure 5F:
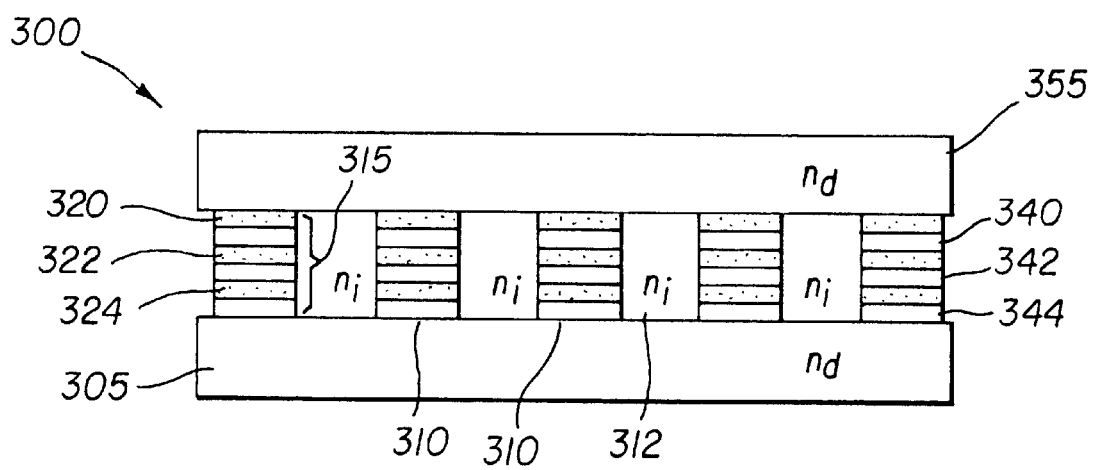

A fully imbedded wire grid polarizer is depicted in FIG. 5f, where the composite wires 310 are not only fabricated on dielectric substrate 305, but are also overlaid and in contact (or nearly so) with a second dielectric substrate 355, to form an integrated device containing an internal polarizing layer. In this case, the integrated device is a plate polarizer. The two dielectric substrates may or may not have identical optical properties. Preferably an intervening optical material of index $n_i$ (dielectric fill 360) is provided, which could comprise an optically clear adhesive (or epoxy or gel), that fills the grooves 312 and contacts the second dielectric substrate 355, helping to secure it against the structure of composite wires 310. Alternately, the dielectric fill 360 could consist of the same dielectric materials used to form the dielectric layers 340, 342, and 344, while a separate optical material, such as an epoxy, is used to secure the second dielectric substrate 355 against the structure of composite wires 310. To avoid internal reflection problems, the intervening optical material used for the dielectric fill 360 in the wire grid polarizers of FIGS. 5e and 5f likely is either index matched to the dielectric substrates ($n_i=n_d$) or has a somewhat lower refractive index ($n_i<n_d$). This intervening optical material may also overcoat the composite wires 310 with a thin layer, rather than having the wires contact the second substrate directly. Unfortunately, filling the grooves with a dielectric material of an index $n_i$ other than air, will degrade the design performance of the wire grid device, by lower contrast and shifting up the low wavelength band edge. These changes can be compensated for by alternate designs for the composite wires 310, which could change both the wire pitch (p) and the intra-wire substructure 315.

Notably, the dielectric substrates of imbedded wire grid polarizer of FIG. 5f could each be right angle prisms, where the polarizing layer is fabricated on the hypotenuse. The prisms can then be assembled to form an integrated polarizing prism. In this case, the polarizing layer lies along the internal diagonal, thereby providing an equivalent to a MacNeille type prism, but presumably having enhanced performance.

As another point, it should be noted that the exemplary devices feature only one device structure with an aperiodic structure. While that device (the sixth example) is relatively simple, much more complicated devices are possible, depending both on the ability to optimize the design and to fabricate the device. The thicknesses of both the metal layers and the dielectric layers that comprise the stratified intra-wire substructure 315 can be varied through the structure. For example, quasi-periodic intra-wire structures, such as chirped structures, could be designed. As another example, the intra-wire structure 315 could be designed to periodically alternate the metal and dielectric layers, except for tuning the thickness of the outermost layer and/or the inmost layer (closest to the dielectric substrate 305), to improve the performance across the interfaces to regions outside the grid. Likewise, dielectric substrate 305 could be coated with an intermediate layer, with the inmost layer of the intra-wire structure of composite wires 310 in direct contact with the intermediate layer, rather than with the dielectric substrate 305. Of course, device optimization not only depends on the details of the intra-wire structure 315, but also on the wire pitch (p) and the wire width (w). In effect, the concepts of designing a wire grid polarizer 300, composed of composite wires 310 with stratified intra-wire structures 315, allow the wire grid device to attain performance levels otherwise provided by smaller pitch structures.

Also, wire grid polarizer 300 could be designed and fabricated with the composite wires 310 having stratified intra-wire structures 315 which vary across the surface of the device. Thus it would be possible to create a spatially variant device for polarization beamsplitting or polarization analysis.

The actual process of designing a wire grid polarizer 300 (or polarization beamsplitter) with the stratified intra-wire substructure 315 comprising multiple metal layers and alternating dielectric layers, as generally depicted in FIGS. 5a–5f, begins with a definition of the specifications for the device. The primary specifications are the spectral bandwidth, angle of light incidence, angular width of the incident light (numerical aperture), the transmission efficiency ("p" pol.,>~80%), the transmitted contrast (>1,000:1 for example), the reflection efficiency ("s" pol.,>~80%), and the reflected contrast (>200:1 for example). The standard wire grid features, wire pitch (p) and wire width (w) are determined, with the minima set by the limiting resolution of the manufacturing process. A nominal stratified intra-wire structure 315 for the composite wires 310, including the number and thickness of the metal layers, and the number and thickness of the dielectric layers is also defined. Other parameters, such as materials choices for the metals and dielectrics, the materials choice for any materials in the grooves 312, and the periodicity or aperiodicity of the intra-wire structure 315 also are defined. Some parameters, such as wire pitch (p), wire width (w), total wire thickness, and the number of layers, may have upper and lower boundary conditions, inside of which, iterative change can occur to drive optimization. The design process can then proceed, assessing the results against the performance targets and manufacturability issues.

Although wire grid polarizer 300, composed of composite wires 310 with stratified intra-wire structures 315, can have a fairly complicated design, the complexity does not necessarily equate to a difficult fabrication process. In general, the tolerances for fabrication of the individual layers, whether metal or dielectric, are relatively loose. Typical layer thickness tolerances are expected to be several nanometers, with some devices having layer tolerances over 10 nm, while others have 1 nm tolerances or less, depending on the design.

Figure 12A:
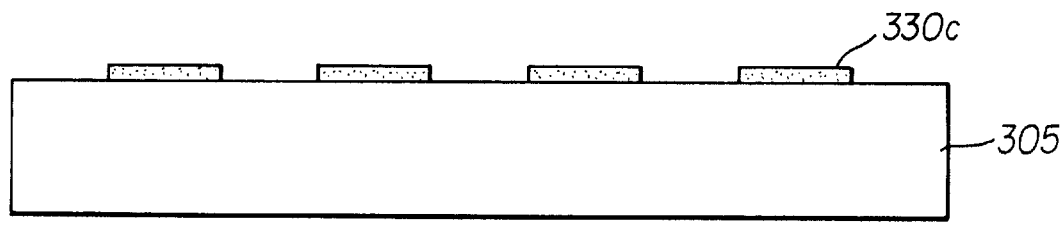
FIGS. 12a–12c are sectional views that sequentially illustrate the fabrication of the wire grid polarizers according to the present invention.
Figure 12B:
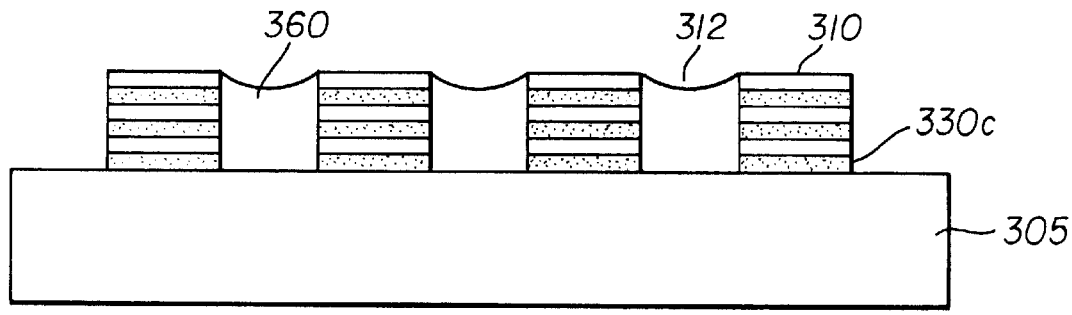
Figure 12C:
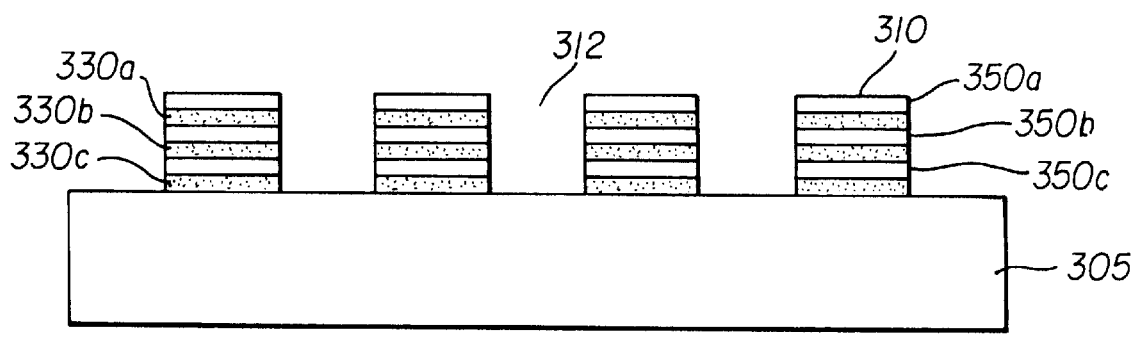

The process for forming the described wire grid structures can be accomplished in several ways. In the case of composite wires 310 with air filling the grooves 312 between the wires, construction begins with a dielectric substrate 305. In the following example, a first metal layer is deposited using a metal such as aluminum. The deposition method can be one of several standard methods including thermal evaporation or sputtering. Next the metal is patterned using standard photolithography followed by a metal etch (possibly dry metal etch such as CC14, BC13), to form a first layer of metal wires 330c. This is shown in FIG. 12a. Next, a first dielectric layer 350c is deposited. Suggested dielectrics include, but are not limited to SiO2 and MgF2. Depending on the equipment used and the number of layers expected, it may be necessary to planarize after a dielectric layer is deposited. Another metal layer (330b) is placed and patterned as before, followed by a dielectric layer (350b), and possibly planarization, to form a metal/dielectric stack. This process is repeated until the metal/dielectric stack has achieved the desired number of layers to form the composite wires 310. Each layer can be designed and controlled with dimensions different from the previous layer. FIG. 12b shows the completed stack of alternating metal wires 330 and dielectric layers 350. Note that a dielectric fill 360 has collected in the grooves 312 during the process of patterning the composite wires 310. In the case where the final layer is metal, after the last metal layer has been patterned, a dielectric etch is used to remove the dielectric fill 360 from the grooves 312 between the composite wires 310. (A possible dry etch of oxide and nitride can include CF4, and SF6.) In the case where the final layer is dielectric, a masking layer is patterned on the final layer of dielectric, the interwire dielectric fill material 360 is removed, and then the masking layer is removed. The final device is shown in FIG. 12c. If the first layer deposited on the dielectric substrate 305 is a dielectric, it may be deposited first, then the metal pattering begins.

An alternative structure with the interwire region (grooves 312) filled with dielectric follows an even simpler fabrication process. The method is as before, except the dielectric is not removed from the interwire regions. This method has the advantage that there is no potential for damage to the composite wires 310 from a dielectric etch process to remove the dielectric fill 360.

Alternatively methods including repeatedly etching the dielectric or ion beam milling could be employed. Also, one could consider lift off methods. If one considers wet etch, particularly if etching follows each layer deposition possible choices of etch chemicals include HF for a SiO2 etch, and PAN for an Aluminum etch. It should be understood that there are many ways to fabricate this device. The choice of method depends on materials used and particular stack structure.

Figure 11A:
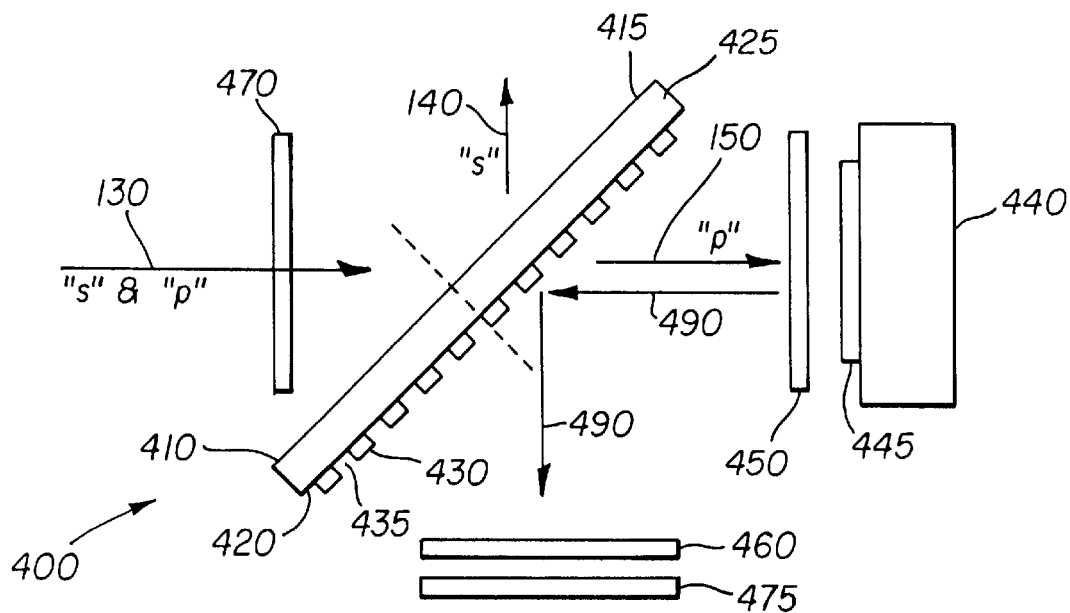
FIGS. 11a–11c are sectional views of various configurations of modulation optical systems that could utilize the wire grid polarizers according to the present invention.

As previously discussed, the wire grid polarizers 300 of the present application, with the stratified intra-wire grid structures having multiple metal layers alternating with dielectric layers, can provide improved performance both as normal incidence polarizers and as off axis incidence polarization beamsplitter. The design and use of this structure as a polarization beamsplitter has considerable attraction, due to the potential to significantly enhance the reflected contrast (Rs/Rp). Accordingly, FIG. 11a depicts a modulation optical system 400, comprising a wire grid polarization beamsplitter 410 and a reflective spatial light modulator 445, where the incident beam of light 130 splits into a reflected light beam 140 and a transmitted light beam 150, the latter of which illuminates the modulator. Spatial light modulator 445, which is part of a modulator assembly 440 that includes mounting, cooling, and an electronics interface (all not shown), is nominally an LCD (liquid crystal display) which modulates the polarization state of the incident transmitted beam of light 150. An image bearing light beam 490 is created by the process of modulation and reflection from the LCD 445, and subsequent reflection off the wire grid polarization beamsplitter 410. The light in the reflected light beam 140 can be directed into a light trap (not shown). The effective optical path to taking by imaging light encompasses incident beam of light 130, transmitted light beam 150, and image bearing light beam 490.

In accordance with the present invention, the wire grid polarization beamsplitter 410 comprises a structure of stratified sub-wavelength wires 430 and grooves 435, with composite wires having a structure of multiple metal layers alternating with dielectric layers, formed on a second surface 420 of dielectric substrate 425. As depicted in FIG. 11a, the wire grid polarization beamsplitter 410 is preferably oriented with the stratified sub-wavelength wires 430 closest to the LCD 445, while the first surface 415 (which is nominally AR coated) faces the incident beam of light 130. By locating the second surface 420 bearing the stratified sub-wavelength wires 430 closest to the LCD 445, the potential for a contrast loss due to thermally induced stress birefringence (from absorbed light) in the wire grid polarization beamsplitter 410 is reduced.

The modulation optical system 400 of FIG. 11a is also depicted as including a pre-polarizer 470, a polarization analyzer 475, and two polarization compensators 450 and 460. Both the pre-polarizer 470 and the polarization analyzer 475 can be wire grid polarizers, including of course, being wire grid polarizers with stratified sub-wavelength wires in accordance with the present invention. These various components may or may not be included, depending on the design targets and constraints. Other components, such as a projection lens (not shown), may interact with this system.

Figure 11B:
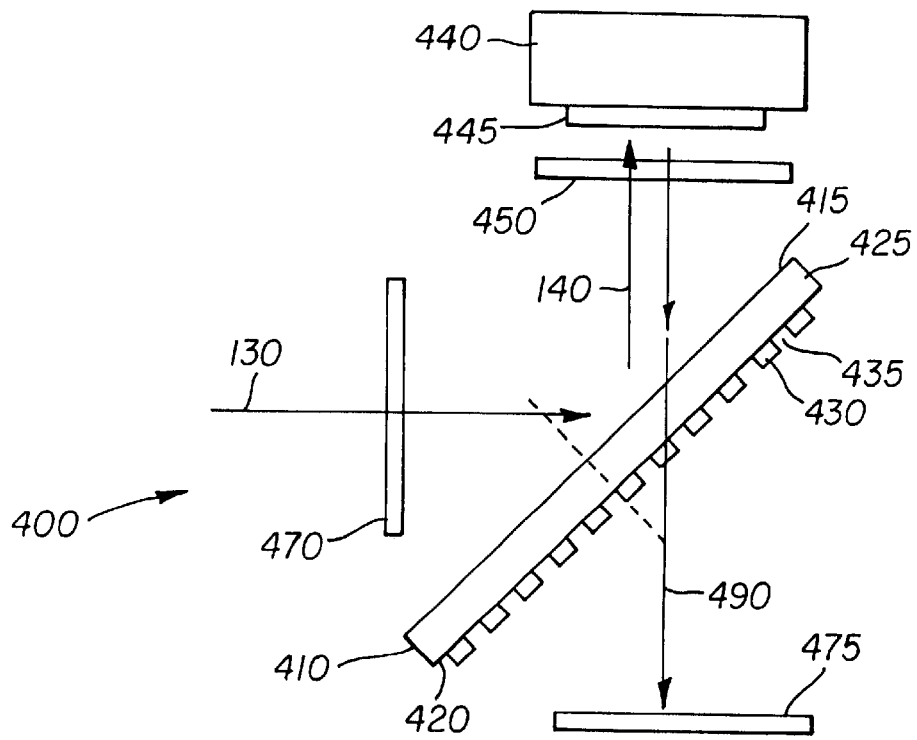

A second exemplary modulation optical system 400 is depicted in FIG. 11b, where the reflected light beam 140 illuminates the reflective spatial light modulator (LCD) 445. The reflective spatial light modulator 445 then rotates the polarization state of the incident light in accordance with the applied control signals, to impart image data to the light. An image bearing light beam 490 is then created as the light is transmitted through the wire grid polarization beamsplitter 410. The effective optical path to taking by imaging light encompasses incident beam of light 130, reflected light beam 140, and image bearing light beam 490. As the wire grid polarization beamsplitter 410 of FIG. 11b comprises in part a tilted plate, an image of LCD 445 that is imaged by a projection lens (not shown) would suffer the aberrations (coma & astigmatism) that are induced by imaging in transmission through a tilted parallel plate dielectric. These aberrations can be optically corrected by a variety of means. Alternately, the wire grid polarization beamsplitter 410 can be modified to comprise an imbedded wire grid polarization beamsplitter, with the polarizing interface contained within a cube prism. Such a prism was described previously.

Figure 11C:
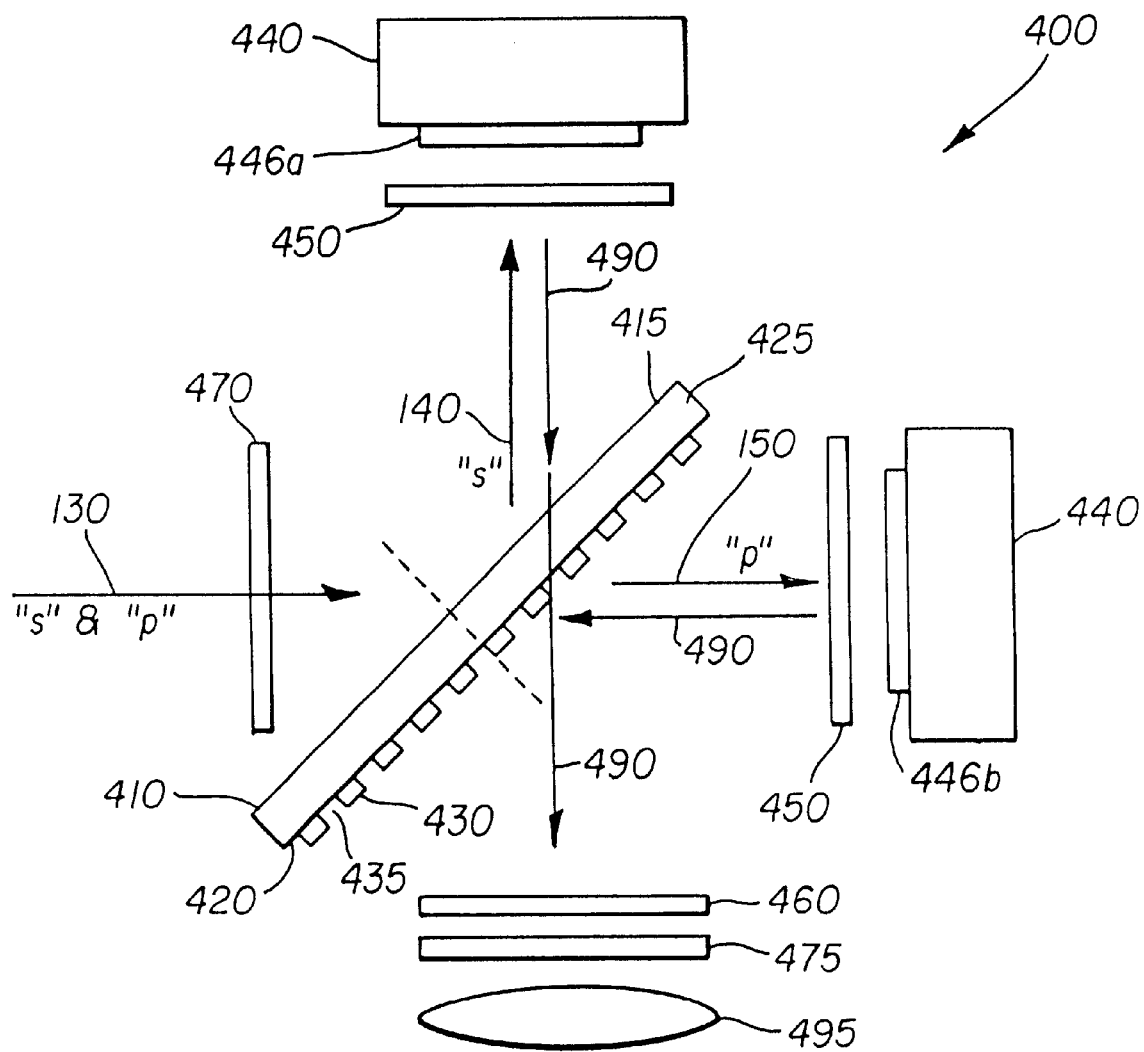

A third exemplary modulation optical system 400 is depicted in FIG. 11c. In this system, the two modulators, LCDS 446a and 446b, are respectively illuminated by the reflected light beam 140 and the transmitted light beam 150. Image bearing light beam 490 is created in combination, utilizing modulated (polarization rotated) light from LCD 446a which is transmitted through wire grid polarization beamsplitter 410 and modulated (polarization rotated) light from LCD 446b which is reflected from wire grid polarization beamsplitter 410. The resulting image bearing light beam, which possesses light of both polarizations ("p" and "s"), is imaged by project lens 495 to a target plane (such as a screen), which is not shown. By equipping modulation optical system 400 of FIG. 11c with two LCDs 445 (one per polarization), the light efficiency of the overall optical system can be enhanced. As an example, a full color system could be developed, where light is split into three color channels (red, green, blue), and each color channels is comprised of a modulation optical system 400 per FIG. 11c, effectively providing a six LCD system. This option can be considered, because the wire grid beamsplitter 410 of the present invention, with its stratified wires comprising multiple metal wires alternating with dielectric layers, simultaneously can provide high contrast both in transmission and reflection. As previously, an alternate wire grid polarization beamsplitter 410 with an imbedded construction forming a cube prism can be used to avoid tilted plate aberrations, and to provide identical optical path lengths for the two imaged light beams.

Other exemplary modulation optical systems can be constructed using the wire grid polarizers 300 of the present application, with the composite wires formed as stratified intra-wire grid structures having multiple metal layers alternating with dielectric layers. For example, an alternate modulation optical system, utilizing a transmissive polarization rotating spatial light modulator, can be constructed where the modulator is located in an optical path between two polarizers (the pre-polarizer and the analyzer), at least one of which is a wire grid polarizer in accordance with the present invention. These wire grid polarizers can be used in combination with types of polarization altering spatial light modulators other than just liquid crystal displays (LCDs). For example, they can be used in conjunction with PLZT modulators. It should be understood that any of the described modulation optical systems 400 can be used as a sub-assembly of some larger system, such as an image printer or a projection display.

Finally, it should be noted that while this concept for an improved wire grid polarizer 300, composed of composite wires 310 with stratified intra-wire structures 315, has been discussed specifically with regards to operation in the visible spectrum, with application for electronic projection, the concept is fully extendable to other applications and other wavelength bands. Although many of the examples focussed on enhancing the reflected contrast across the entire visible spectrum, or across the blue spectrum, it is of course possible to enhance the reflected contrast for the other color bands individually (green and red). Indeed, the performance enhancements in the green and red spectra can be more dramatic than in the blue spectrum. Alternately, such devices could be designed and fabricated at near infrared wavelengths (~1.0–1.5 $\mu$m) for use in optical telecommunication systems, or in the far infrared (such as 20 $\mu$m), or in the electromagnetic spectrum generally. The concept also has the potential to produce narrow wavelength polarization devices where the "p" transmitted contrast is >$10^8$:1, and where the "s" reflected contrast is >$10^4$:1. Likewise, a narrow wavelength notch polarization beamsplitter could be designed, in either the visible or infrared spectra for example, where the "p" and "s" polarization discrimination were simultaneously optimized to produce a polarization beamsplitter with superior overall contrast. Also, the third example device suggests a polarization filter device with a structure which can provide large wavelength bands with high polarization contrast, surrounding an intermediate wavelength band which provides minimal polarization contrast (see FIG. 8a).

For example, such a device could be useful in a product assembly line for quality and defect inspection, when combined with properly structured illumination.

The invention has been described in detail with particular reference to certain preferred embodiments thereof, but it will be understood that variations and modifications can be effected within the scope of the invention.

PARTS LIST

100. Wire grid polarizer
110. Parallel conductive electrodes (wires)
115. Grooves
120. Dielectric substrate
130. Beam of light
132. Light source
140. Reflected light beam
150. Transmitted light beam
160. Diffracted light beam
200. Transmission efficiency curve
205. Transmitted contrast ratio curve
210. Reflected contrast ratio curve
220. Transmission efficiency curve
225. Reflected contrast ratio curve
250. Transmitted beam contrast
255. Reflected beam contrast
275. Overall contrast ratio
300. Wire grid polarizer
305. Dielectric substrate
307. Surface
310. Composite wires
312. Grooves
315. Intra-wire structure
320. Metal wires
322. Metal wires
324. Metal wires
330a–i. Metal wires
340. Dielectric layers
342. Dielectric layers
344. Dielectric layers
350a–i. Dielectric layers
355. Second dielectric substrate
360. Dielectric fill
400. Modulation optical system
410. Wire grid polarization beamsplitter
415. First surface
420. Second surface
425. Dielectric substrate
430. Stratified sub-wavelength wires
435. Grooves
440. Modulator assembly
445. Spatial light modulator (LCD)
446a. Spatial light modulator (LCD)
446b. Spatial light modulator (LCD)
450. Polarization compensator
460. Polarization compensator
470. Pre-polarizer
475. Polarization analyzer
490. Image bearing light beam
495. Project lens

What is claimed is:

1. An immersed wire grid polarizer for polarizing an incident light beam, comprising:

a substrate having a surface;

an array of parallel, elongated, composite wires with intervening grooves disposed on said surface, wherein each of said composite wires are spaced apart at a grid period less than a wavelength of said incident light;

wherein each of said grooves is filled with a dielectric optical material;

wherein each of said composite wires comprises an intra-wire substructure of alternating elongated metal wires and elongated dielectric layers; and wherein said intra-wire substructure of alternating elongated metal wires and elongated dielectric layers comprises at least two of said elongated metal wires.

2. An immersed wire grid polarizer according to claim 1 wherein said wire grid polarizer is oriented at an angle relative to said incident light beam such that said wire grid polarizer functions as a polarization beamsplitter and separates a transmitted polarized beam and a reflected polarized beam from said angle of said incident light beam.

3. An immersed wire grid polarizer according to claim 1 wherein said intra-wire substructure of alternating elongated metal wires and elongated dielectric layers supports resonance enhanced tunneling through said elongated metal wires, thereby enhancing transmission of the light of the polarization state orthogonal to said array of composite wires.

4. An immersed wire grid polarizer according to claim 1 wherein said intra-wire substructure of alternating elongated metal wires and elongated dielectric layers comprises at least one of said dielectric layers.

5. An immersed wire grid polarizer according to claim 1 wherein said incident light is within the range of approximately 0.4 to 1.6 $\mu$m in the electromagnetic spectrum.

6. An imbedded wire grid polarizer for polarizing an incident light beam, comprising:

a first dielectric substrate having a surface;

a second dielectric substrate having a surface;

an array of parallel, elongated, composite wires with intervening grooves are disposed on said surface of said first dielectric substrate, wherein each of said composite wires are spaced apart at a grid period less than a wavelength of said incident light;

wherein said array of parallel, elongated composite wires comprise a polarizing layer located between said surface of said first dielectric substrate and said surface of said second dielectric substrate;

wherein each of said composite wires comprises an intra-wire substructure of alternating elongated metal wires and elongated dielectric layers; and wherein said intra-wire substructure of alternating elongated metal wires and elongated dielectric layers comprises at least two of said elongated metal wires.

7. An imbedded wire grid polarizer according to claim 6 wherein a dielectric optical material fills said grooves and contacts said surface of said second dielectric substrate.

8. An imbedded wire grid polarizer according to claim 6 wherein said wire grid polarizer is oriented at an angle relative to said incident light beam such that said wire grid polarizer functions as a polarization beamsplitter and separates a transmitted polarized beam and a reflected polarized beam from said angle of said incident light beam.

9. An imbedded wire grid polarizer according to claim 6 wherein said intra-wire substructure of alternating elongated metal wires and elongated dielectric layers supports resonance enhanced tunneling through said elongated metal wires, thereby enhancing transmission of the light of the polarization state orthogonal to said array of composite wires.

10. An imbedded wire grid polarizer according to claim 6 wherein said intra-wire substructure of alternating elongated metal wires and elongated dielectric layers comprises at least one of said dielectric layers.

11. An imbedded wire grid polarizer according to claim 6 wherein said incident light is within the range of approximately 0.4 to 1.6 $\mu$m in the electro-magnetic spectrum.

12. An imbedded wire grid polarizer according to claim 6 wherein said first dielectric substrate and said second dielectric substrate are fabricated to form an integrated polarizing device that is either a plate polarizer or a cube prism polarizer.

13. A modulation optical system for providing high contrast modulation of an incident light beam, comprising:

(a) a wire grid polarization beamsplitter with a substrate having a surface;

(i) an array of parallel, elongated, composite wires disposed on said surface, wherein each of said composite wires are spaced apart at a grid period less than a wavelength of said incident light;

(ii) wherein each of said composite wires comprises an intra-wire substructure of alternating elongated metal wires and elongated dielectric layers;

(iii) wherein said intra-wire substructure of alternating elongated metal wires and elongated dielectric layers comprises at least two of said elongated metal wires; and wherein said wire grid polarization beamsplitter transmits a first polarization state of said light beam and reflects a second polarization state of said light beam, wherein said second polarization state is orthogonal to said first polarization state;

(b) a reflective spatial light modulator having a plurality of individual elements which alter said first polarization state of said transmitted light beam to provide an image bearing beam; and (c) wherein said image bearing beam reflects from said wire grid polarization beamsplitter.

14. A modulation optical system according claim 13 which includes a polarization analyzer which transmits said image bearing light beam and attenuates unwanted polarization components of said image bearing light beam.

15. A modulation optical system according to claim 13 which includes a pre-polarizer for pre-polarizing said beam of light.

16. A modulation optical system according to claim 13 wherein said spatial light modulator is a liquid crystal display device.

17. A modulation optical system according to claim 13 wherein said composite wires on said wire grid polarization beamsplitter face said reflective spatial light modulator.

18. A modulation optical system for providing high contrast modulation of an incident light beam, comprising:

(a) a wire grid polarization beamsplitter with a substrate having a surface;

(i) an array of parallel, elongated, composite wires disposed on said surface, wherein each of said composite wires are spaced apart at a grid period less than a wavelength of said incident light;

(ii) wherein each of said composite wires comprises an intra-wire substructure of alternating elongated metal wires and elongated dielectric layers;

(iii) wherein said intra-wire substructure of alternating elongated metal wires and elongated dielectric layers comprises at least two of said elongated metal wires;

wherein said wire grid polarization beamsplitter reflects a first polarization state of said light beam and transmits a second polarization state of said light beam, wherein said second polarization state is orthogonal to said first polarization state;

(b) a reflective spatial light modulator having a plurality of individual elements which alter said first polarization state of said reflected light beam to provide an image bearing beam; and
(c) wherein said image bearing beam is transmitted through said wire grid polarization beamsplitter.

19. A modulation optical system according claim 18 which includes a polarization analyzer which transmits said image bearing light beam and attenuates unwanted polarization components of said image bearing light beam.

20. A modulation optical system according to claim 18 which includes a pre-polarizer for pre-polarizing said beam of light.

21. A modulation optical system according to claim 18 wherein said spatial light modulator is a liquid crystal display device.

22. A modulation optical system according to claim 18 wherein said composite wires on said wire grid polarization beamsplitter face said reflective spatial light modulator.

23. A modulation optical system for providing high contrast modulation of an incident light beam, comprising:
   (a) a wire grid polarization beamsplitter with a substrate having a surface;
      (i) an array of parallel, elongated, composite wires disposed on said surface, wherein each of said composite wires are spaced apart at a grid period less than a wavelength of said incident light;
      (ii) wherein each of said composite wires comprises an intra-wire substructure of alternating elongated metal wires and elongated dielectric layers;
      (iii) wherein said intra-wire substructure of alternating elongated metal wires and elongated dielectric layers comprises at least two of said elongated metal wires; wherein said wire grid polarization beamsplitter reflects a first polarization state of said light beam and transmits a second polarization state of said light beam, wherein said second polarization state is orthogonal to said first polarization state;
   (b) a first reflective spatial light modulator having a plurality of individual elements which alter said first polarization state of said reflected light beam to provide an image bearing beam, where said image bearing beam is subsequently transmitted through said wire grid polarization beamsplitter; and
   (c) a second reflective spatial light modulator having a plurality of individual elements which alter said second polarization state of said transmitted light beam to provide a second image bearing beam, where said second image bearing beam is subsequently reflected off said wire grid polarization beamsplitter.

24. A modulation optical system according claim 23 which includes a polarization analyzer which transmits said first and second image bearing light beams and attenuates unwanted polarization components of said image bearing light beams.

25. A modulation optical system according to claim 23 which includes a pre-polarizer for pre-polarizing said beam of light.

26. A modulation optical system according to claim 23 wherein said first and second spatial light modulators are liquid crystal display devices.

27. A modulation optical system for providing high contrast modulation of an incident light beam, comprising:
   (a) a wire grid polarizer with a substrate having a surface;
      (i) an array of parallel, elongated, composite wires disposed on said surface, wherein each of said composite wires are spaced apart at a grid period less than a wavelength of said incident light;
      (ii) wherein each of said composite wires comprises an intra-wire substructure of alternating elongated metal wires and elongated dielectric layers;
      (iii) wherein said intra-wire substructure of alternating elongated metal wires and elongated dielectric layers comprises at least two of said elongated metal wires; wherein said wire grid polarizer reflects a first polarization state of said light beam and transmits a second polarization state of said light beam, wherein said second polarization state is orthogonal to said first polarization state;
   (b) a spatial light modulator having a plurality of individual elements which alters said second polarization state of said light beam to provide an image bearing beam;
   (c) at least one additional polarizer to enhance the polarization contrast ratio of said image bearing beam; and wherein said spatial light modulator is located in an optical path traversed by said light beam such that it is between said wire grid polarizer and said additional polarizer.

28. A wire grid polarizer for polarizing an incident light beam comprising:
   a substrate having a surface;
   an array of parallel, elongated, composite wires with intervening grooves disposed on said surface, wherein each of said composite wires are spaced apart at a grid period;
   wherein each of said composite wires comprises an intra-wire substructure of alternating elongated metal wires and elongated dielectric layers; and
   wherein said intra-wire substructure of alternating elongated metal wires and elongated dielectric layers comprises at least two of said elongated metal wires.

29. A wire grid polarizer as in claim 28 wherein each of said grooves are filled with a dielectric optical material.

30. A wire grid polarizer as in claim 29 wherein said dielectric optical material is selected from a group comprised of an optically clear liquid, adhesive, and gel.

31. A wire grid polarizer as in claim 29 wherein said dielectric optical material has an index of refraction which is the same as the index of refraction of said elongated dielectric layers.

32. A wire grid polarizer as in claim 28 wherein said wire grid polarizer is oriented at an angle relative to said incident light beam.

33. A wire grid polarizer as in claim 28 wherein said intra-wire substructure of alternating elongated metal wires and elongated dielectric layers provide resonance enhanced tunneling through said elongated metal wires.

34. A wire grid polarizer as in claim 33 wherein one of said dielectric layers is adjacent to said surface of said substrate.

35. A wire grid polarizer as in claim 33 wherein one of said dielectric layers forms a top layer of said intra-wire substructure.

36. A wire grid polarizer as in claim 33 wherein at least one of said dielectric layers has a thickness different from each of said other dielectric layers.

37. A wire grid polarizer as in claim 33 wherein at least one of said dielectric layers has a different refractive index than said other dielectric layers.

38. A wire grid polarizer as in claim 28 wherein said intra-wire substructure of alternating elongated metal wires and elongated dielectric layers comprises at least one of said dielectric layers.

39. A wire grid polarizer as in claim 28 wherein said intra-wire substructure of alternating elongated metal wires and elongated dielectric layers comprise a plurality of said dielectric layers.

40. A wire grid polarizer as in claim 28 wherein one of said elongated metal wires is adjacent to said surface of said substrate.

41. A wire grid polarizer as in claim 28 wherein one of said elongated metal wires forms a top surface of said intra-wire substructure.

42. A wire grid polarizer as in claim 28 wherein said elongated dielectric layers are thicker than said elongated metal wires.

43. A wire grid polarizer as in claim 28 wherein a thickness of said composite wire is between one-half to five wavelengths of said incident light.

44. A wire grid polarizer as in claim 28 wherein said elongated metal wires have a thickness between 1–4 skin depth thicknesses.

45. A wire grid polarizer as in claim 28 wherein said elongated metal wires are selected from a group comprising aluminum, gold, and silver.

46. A wire grid polarizer as in claim 28 wherein said elongated dielectric layers are selected from a group comprising MgF2, SiO2, and TiO2.

47. A wire grid polarizer as in claim 28 wherein a thickness of said composite wires varies across the surface of said substrate.

* * * * *